United States Patent [19]
Shibata et al.

[11] Patent Number: 4,554,596
[45] Date of Patent: Nov. 19, 1985

[54] COLOR VIDEO SIGNAL RECORDING APPARATUS

[75] Inventors: Akira Shibata, Katsuta; Noboru Kojima, Yokohama; Tomomitsu Kuroyanagi, Katsuta, all of Japan

[73] Assignee: Hitachi, Ltd., Tokyo, Japan

[21] Appl. No.: 438,246

[22] Filed: Nov. 1, 1982

[30] Foreign Application Priority Data

Nov. 4, 1981 [JP] Japan ................................ 56-175673
Nov. 4, 1981 [JP] Japan ................................ 56-175677
Nov. 4, 1981 [JP] Japan ................................ 56-175678
Mar. 12, 1982 [JP] Japan ................................ 57-37994
Mar. 12, 1982 [JP] Japan ................................ 57-37996
Apr. 2, 1982 [JP] Japan ................................ 57-53820

[51] Int. Cl.$^4$ ......................................... H04N 9/493
[52] U.S. Cl. ................................................. 358/330
[58] Field of Search .......................................... 358/330

[56] References Cited
FOREIGN PATENT DOCUMENTS 2652905 7/1978 Fed. Rep. of Germany ...... 358/330

Primary Examiner—Michael A. Masinick
Attorney, Agent, or Firm—Antonelli, Terry & Wands

[57] ABSTRACT

Disclosed is a color video signal recording apparatus wherein the chrominance signal and the luminance signal are separated from the composite color video signal, the luminance signal is transformed into a frequency modulation signal and the chrominance signal is converted to have a lower frequency so that both reformed signals are recorded on a frequency multiplex basis on a recording medium. In processing a TV signal of CCIR system, the chrominance signal is controlled to have a frequency of $\frac{3}{8}$ N·$f_H$ (where N is an odd number) and have its phase shifted by 90° in every horizontal scanning period; in processing a TV signal of NTSC system, the chrominance signal is controlled to have a frequency of $\frac{3}{8}$ N·$f_H$ (where N is an integer) and have its phase shifted by 90° or 180° in every horizontal scanning period, while the control being made such that $\frac{1}{4}$ N is an integer in case of 90° phase shift of (3N−2)/4 is an integer in case of 180° phase shift.

5 Claims, 21 Drawing Figures

COLOR VIDEO SIGNAL RECORDING APPARATUS

The present invention relates to a magnetic recording apparatus for recording color television signals on a magnetic tape and reproducing the signals recorded on the magnetic tape and, more particularly, to a chroma signal processing circuit which processes the chroma signal in the color television signal of NTSC system and the chroma signal in the color television signal of CCIR system.

In the household magnetic recording and reproducing apparatus for recording a field of video signal aslant on the magnetic tape, the composite color television signal is separated into the luminance signal and the chrominance signal, and these signals are processed separately and recorded on the magnetic tape. In more detail, the luminance signal extracted from the composite color television signal is modulated so that it is transformed into the frequency modulation signal, and the color subcarrier frequency of the chrominance signal is converted into a low frequency in the lower frequency band. Then, both signals are mixed to form a frequency multiplex signal, and it is recorded on the video track of the magnetic tape.

In order for the household magnetic recording and reproducing aparatus to have a higher recording density on the magnetic tape, the video signal is recorded without providing a guard band between adjacent video tracks. This causes signals recorded on adjacent video tracks to mix with each other, creating a crosstalk component during the reproducing operation. On this account, two video heads having different azimuth angles are used alternately so as to eliminate the crosstalk component by utilization of the azimuth loss in the heads. However, the azimuth loss in the video head is effective for a signal with a higher frequency such as the luminance signal, whereas it has little effect for a low-frequency signal below 1 MHz, and therefore, the chrominance signal which has been stepped down to a low frequency band cannot be rid of a crosstalk by the azimuth loss. On this account, in general, the crosstalk component of the chrominance signal is eliminated in reproduction by utilization of the vertical correlation in the video signal.

There have been known two systems of color signal transformation for eliminating the crosstalk of the chrominance signal (will be termed simply chroma signal hereinafter) during reproduction by utilization of the vertical correlation of the video signal. In one system for recording color television signals of the NTSC system, 4-phase shift system is applied to the chroma signal, in which the chroma signal is phase-shifted by 90° in every horizontal period (will be termed simply 1H hereinafter) and the phase shift direction is reversed for each field for recording. In recording color television signals of CCIR system, a single-field 4-phase shift system is applied to the chroma signal, in which the chroma signal for one field is phase-shifted by 90° in every 1H and another field is recorded without the phase shift.

In the second system for recording color television signals of the NTSC system, a single-field phase invert system is applied to the chroma signal, with the chroma signal of one field phase-reversed for every 1H and another field is recorded without the phase shift. In recording color television signals of CCIR system, a frequency interleave system is applied to the chroma signal, in which an offset of ¼ of the horizontal frequency (will be termed simply $f_H$ hereinafter) is provided between fields when the chroma signal is recorded.

In these prior art technologies, however, the chroma signal is processed differently in the NTSC system and the CCIR system, resulting disadvantageously in the need for individual processing circuits. In addition, in order for the household magnetic recording and reproducing apparatus to playback at the same tape speed as in recording, control pulses are recorded on the control track of the magnetic tape when it is recorded, and it is retrieved in the playback operation so as to control the tape speed. This control track is located at the bottom edge of the magnetic tape along the longitudinal direction.

Recently, an attempt for making the tape width more narrow has been made by eliminating the control track, thereby to provide more compact magnetic recording and reproducing apparatus. On this account, four pilot signals in place of the conventional control pulses are recorded on the video track on a multiplex basis with the video signal, and the four pilot signals are retrieved during the playback operation so as to control the playback tape speed. The four pilot signals are allocated in a frequency band lower than the band of the chroma signal. However, in the conventional household magnetic recording and reproducing apparatus, the lower side band of the chroma signal is located nearby the cutoff frequency of the video head response, preventing the pilot signals from being frequency-multiplexed simply, but necessitating the band of the chroma signal to be shifted to a higher frequency band.

SUMMARY OF THE INVENTION

It is an object of the present invention to provide a color video signal recording apparatus capable of converting the frequency of the chroma signal in the color television signal of the NTSC system and the chroma signal in the color television signal of the CCIR system into lower frequencies by using a common circuit.

Another object of the present invention is to provide a color video signal recording apparatus capable of producing the pilot signals without using a dedicated oscillator.

The inventive color video signal recording apparatus sets the frequency of the chroma signal to $\frac{3}{8} \cdot N \cdot f_H$ (where N is an odd number) for recording the color television signal of the CCIR system, with the chroma signal of one of the first and second fields being phase-shifted by 90° in every horizontal period. For the color television signal of the NTSC system, the frequency of the chroma signal is set to $\frac{3}{8} \cdot N \cdot f_H$ (where N is an integer) and the chroma signal is phase-shifted by 90° in every horizontal period with the value of N being chosen so that ¼ N is an integer, or the chroma signal of either first or second field is phase-shifted by 180° in every horizontal period, with the value of N being chosen so that $(3N-2)/4$ is an integer.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Before entering into the inventive color video signal recording apparatus, the arrangement of the chroma signal frequency converting circuit used in the conventional magnetic recording and reproducing apparatus and problems thereof will be described.

Figure 1:
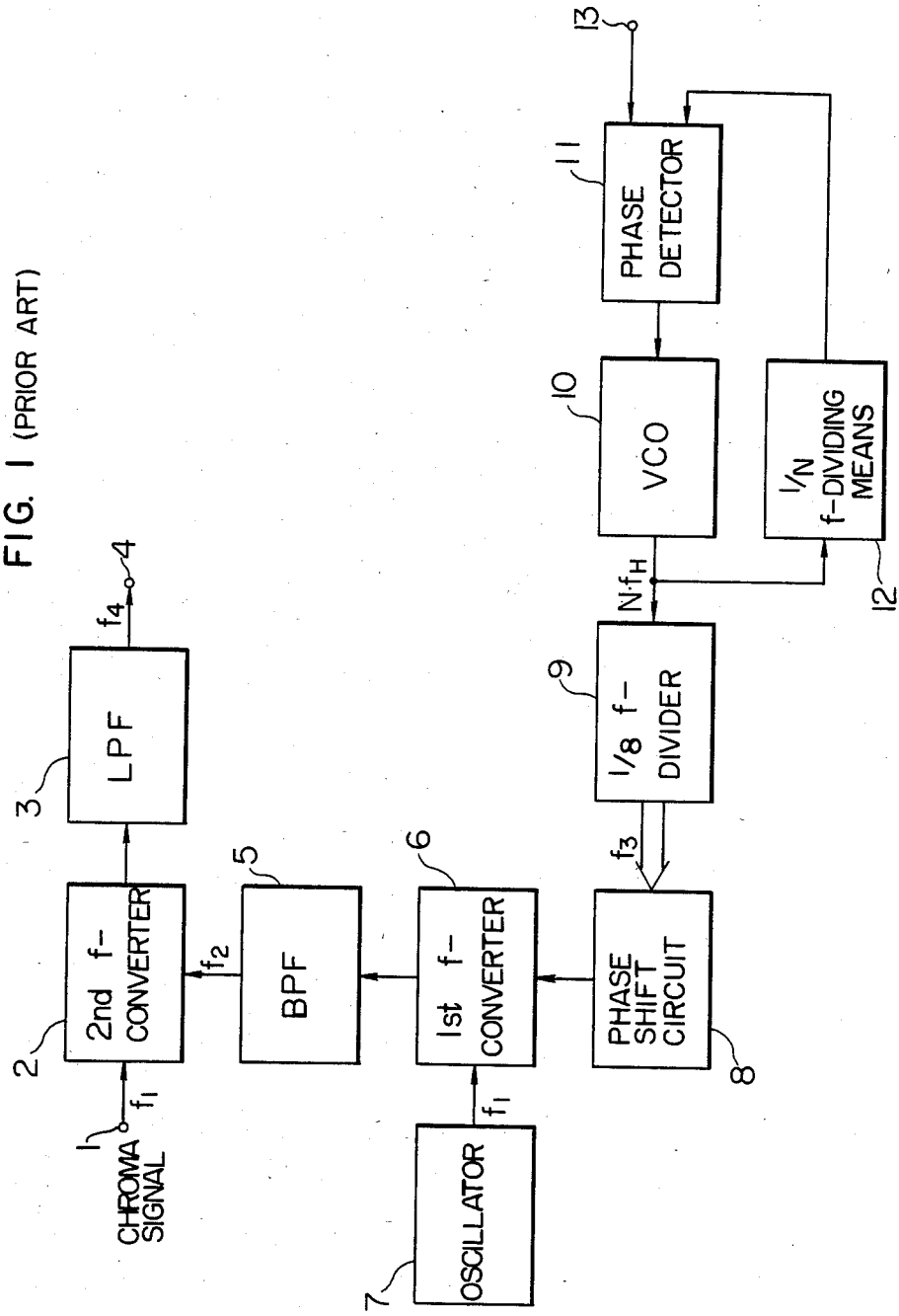
FIG. 1 is a block diagram showing the chroma signal frequency converting circuit used in the conventional magnetic recording and reproducing apparatus.

FIG. 1 shows in block diagram the principal portions of the frequency converting circuit for the chroma signal used in the conventional household magnetic recording and reproducing apparatus. The chroma signal separated from the composite color television signal is supplied to input terminal 1. The chroma signal received by the input terminal 1 has the first frequency of $f_1$, and it is fed to the second frequency converter 2. The second frequency converter 2 is supplied with a carrier signal having the second frequency $f_2$ though band-pass filter (BPF) 5, and the converter 2 operates to mix the chroma signal and the carrier signal to provide a chroma signal having a frequency of $f_2-f_1$ and a chroma signal having a frequency of $f_2+f_1$ for the following low-pass filter (LPF) 3. The LPF 3 conducts only one of chroma signals having a lower frequency, i.e., $f_2-f_1$, and passes it as output frequency $f_4$ to output terminal 4. The chroma signal provided at the output terminal 4 is then mixed with the luminance signal, and the resultant signal is recorded on the magnetic tape. Voltage controlled oscillator (VCO) 10 provides the oscillation output for $\frac{1}{8}$ frequency divider 9 and 1/N frequency divider 12, and the 1/N frequency divider 12 reduces the frequency of the oscillation output by 1/N and supplies the divided frequency signal to phase detector 11. The phase detector 11 compares the phase of the horizontal synchronizing signal in the color television signal received at input terminal 13 with the phase of the output signal of the 1/N frequency divider 12, and controls the VCO 10 so as to lock the phase of the oscillation output of the VCO 10 to the phase of the horizontal signal. The $\frac{1}{8}$ frequency divider 9 reduces the frequency of the output signal of the VCO 10 by $\frac{1}{8}$ so as to produce the third frequency $f_3$ and supplies it to phase shift circuit 8. The phase shift circuit 8 shifts the phase of the output signal from the $\frac{1}{8}$ frequency divider 9 by 90° or 180° and supplies the output to the first freuqency converter 6. Crystal oscillator 7 generates the signal having the same frequency $f_1$ as of the chroma signal received by the input terminal 1, and supplies the oscillation output to the first frequency converter 6. The first frequency converter 6 mixes the output signal of the oscillator 7 with the output signal of the phase shift circuit 8 to produce a carrier signal having a frequency of $f_1+f_3$ and another carrier signal having a frequency of $f_1-f_3$, then supplies these carrier signals to the BPF 5. The BPF 5 conducts only one of the output signals from the first frequency converter 6 having a higher frequency, i.e., $f_1+f_3$, and supplies it as a carrier signal having the second frequency $f_2=f_1+f_3$ to the second frequency converter 2. Then, as mentioned previously, the second frequency converter 2 mixes the carrier signal having the second frequency $f_2$ with the chroma signal having the first frequency, to provide at its output terminal 4 the chroma signal having the fourth frequency $f_4$ which is the difference between the frequency $f_2$ of the carrier signal and the frequency $f_1$ of the chroma signal.

The following will describe two methods of converting chroma signal frequency by the arrangement of FIG. 1 used in the conventional household magnetic recording and reproducing apparatus.

First, the first system of frequency conversion for the chroma signal in the NTSC system color television signal will be described. In this case, the abovementioned first frequency $f_1$ is chosen to be 3.58 MHz and the oscillation frequency $N \cdot f_H$ of the VCO 10 be $320 \times 15.7$ kHz=5.04 MHz. The frequency division factor of the 1/N divider 12 is $1/N=1/320$. The phase shift circuit 8 shifts the phase of the third frequency ($f_3$) signal by +90° in every horizontal scanning period for the first field and by −90° for the second field. Consequently, the third frequency $f_3$ becomes $f_3=(320/8+\frac{1}{4})f_H=(40+\frac{1}{4})f_H$ for the first field, and $f_3=(320/8-\frac{1}{4})f_H=(40-\frac{1}{4})f_H$ for the second field.

Accordingly, the second frequency $f_2$ becomes $f_2=3.58$ MHz$+(40\pm\frac{1}{4})f_H$ and the recording chroma frequency $f_4$ becomes $f_4=f_2-f_1=(40\pm\frac{1}{4})f_H$, that satisfies the necessary conditions of the recording chroma frequency of the NTSC system: "it must have the offset of $\frac{1}{4}f_H$" and "it must have a frequency difference of an odd multiple of $\frac{1}{2}f_H$ between fields".

The following will describe the frequency conversion for the chroma signal in the CCIR color television signal performed by the first system. In this case, the first frequency is chosen to be $f_1=4.43$ MHz and the oscillation frequency of the VCO 10 is $321\times15.6=5.02$ MHz. The frequency division factor of the 1/N divider 12 is 1/321. The phase shift circuit 8 does not carry out phase shift for the first field and shifts the phase of the third frequency ($f_3$) signal by $-90°$ in every horizontal scanning period for the second field. Consequently, the third frequency is $f_3=321/8f_H=(40+\frac{1}{8})f_H$ for the first field, and $f_3=(321/8-\frac{1}{8})f_H=(40-\frac{1}{8})f_H$ for the second field. Accordingly, the second frequency $f_2$ becomes $f_2=4.43+(40\pm\frac{1}{8})f_H$ and the fourth frequency $f_4$ of the recording chroma signal becomes $f_4=(40\pm\frac{1}{8})f_H$, that satisfies the necessary conditions of the recording chroma frequency of CCIR system: "it must have the offset of $\frac{1}{8}f_H$" and "it must have a frequency difference of an odd multiple of $\frac{1}{4}f_H$ between fields". The problem raised here is that the NTSC system needs a 1/320 divider, while the CCIR system needs a 1/321 divider for the 1/N frequency divider 12. Therefore, in designing a common integrated circuit for NTSC and CCIR systems in accordance with the first system, the division factor of the frequency divider 12 needs to be switched for 1/320 and 1/321. Since both factors are developed as $1/320=\frac{1}{2}\times\frac{1}{2}\times\frac{1}{2}\times\frac{1}{2}\times\frac{1}{2}\times1/5$ and $1/321=\frac{1}{3}\times1/107$, and have no common prime number. The frequency divider 12 receives a high frequency input of 5 MHz, and it needs high-speed flip-flops (FFs) for dividing the frequency. The 1/320 divider is arranged by a cascade connection of six $\frac{1}{2}$ dividers and a 1/5 divider, and only the first-stage $\frac{1}{2}$ divider needs a high-speed flip-flop. Similarly, the 1/321 divider needs two high-speed flip-flops for only the first-stage $\frac{1}{3}$ divider. However, a frequency divider operable for both 1/320 and 1/321 divisions by switching cannot separate the high-speed and low-speed divider sections, since numbers 320 and 321 have no common prime number, and therefore it must be arranged entirely using high-speed flip-flops. More than eight high-speed flip-flops are needed for providing a 1/320 divider and 1/321 divider.

If the input frequency is below 3 MHz flip-flops of the I²L (Integrated Injection Logic) type can be employed, which saves the chip area and power consumption considerably when fabricated into an integrated circuit. On the other hand, an input frequency above 3 MHz needs flip-flops of the ECL (Emitter Coupled Logic) type or the like, resulting in an increased chip area and power consumption. Generally speaking, an ECL device needs a ten-fold of chip area and ten-fold of power consumption as much as those of an I²L device, and there is a big difference in needing only one high-speed flip-flop or more than eight.

The following will describe the frequency conversion for the chroma signal of the NTSC color television signal in accordance with the second system. In this case, the above-mentioned first frequency $f_1$ is chosen to be 3.58 MHz and the oscillation frequency of the VCO 10 be $350\times15.7$ kHz=5.5 MHz. The frequency division factor of the 1/N divider 12 is $1/N=1/350$. The phase shift circuit 8 performs phase shift by $+180°$ in every horizontal scanning period for the first field, and performs no phase shift for the second field. Consequently, the third frequency $f_3$ becomes $f_3=(350/8+\frac{1}{4})f_H=(44+\frac{1}{4})f_H$ for the first field, and $f_3=350/8f_H=(44-\frac{1}{4})f_H$ for the second field. Accordingly, the second frequency $f_2$ becomes $f_2=3.58+(44\pm\frac{1}{4})f_H$ and the fourth frequency of the recording chroma signal becomes $f_4=(44\pm\frac{1}{4})f_H$, that satisfies the necessary conditions for the recording chroma frequency of NTSC system.

The following will describe the frequency conversion for the chroma signal in the CCIR color television signal. In this case, the first frequency $f_1$ is chosen to be 4.43 MHz, and the frequency division factor N of the 1/N divider 12 varies for each field, N=351 for the first field and N=353 for the second field. Accordingly, the oscillation frequency of the VCO 10 becomes $(352\pm1)\times15.6$ kHz and the 1/N frequency divider 12 has a factor of $1/N=1/(352\pm1)$. The phase shift circuit 8 does not provide phase shifting for both fields. Consequently, the third frequency becomes $f_3=351/8f_H=(44-\frac{1}{8})f_H$ for the first field, and $f_3=353/8f_H=(44+\frac{1}{8})f_H$ for the second field. Accordingly, the second frequency becomes $f_2=4.43+(44\pm\frac{1}{8})f_H$ and the fourth frequency of the recording chroma signal becomes $f_4=(44\pm\frac{1}{8})f_H$, that satisfies the necessary conditions for the recording chroma frequency in CCIR system.

The problem raised here is that the NTSC system needs a 1/350 divider, while the CCIR system needs a 1/351 divider for the first field and a 1/353 divider for the second field for the 1/N frequency divider 12. Therefore, in designing a common integrated circuit for the NTSC and CCIR systems in accordance with the second system, the division factor of the frequency divider 12 needs to be switched for 1/350, 1/351 and 1/353. Since these factors are developed as $1/350=\frac{1}{2}\times1/5\times1/5\times1/7$, $1/351=\frac{1}{3}\times\frac{1}{3}\times\frac{1}{3}\times1/13$ and 1/353, and have no common prime number, the 1/N frequency divider 12 needs more than eight high-speed flip-flops by the same reason as mentioned previously, resulting in an increased chip size and power consumption.

It can be considered that the division factor of the $\frac{1}{8}$ divider 9 is halved so that it is reduced to a $\frac{1}{4}$ frequency divider. In this case the oscillation frequency of the VCO 10 can be as low as the half of the former case, with the 1/N divider 12 having a division factor half that of the former case. However, this arrangement is not proper for the case of recording the CCIR color television signal. In recording the CCIR color television signal, the recording chroma signal must have an offset frequency of an odd multiple of $\frac{1}{8}f_H$, and it is not possible for the chroma signal to have that offset frequency when the VCO output is divided by 4. Accordingly, the frequency divider 9 must also be a $\frac{1}{8}$ divider, and the oscillation frequency of the VCO 10 cannot be halved.

In addition, since the chroma signal in the NTSC color television signal and the chroma signal in the CCIR color television signal have each different frequency, the oscillator 7 for generating the carrier signal must be provided with separate crystals for NTSC and CCIR systems when it is used commonly for both systems.

Moreover, a crystal oscillator providing the same frequency as the color signal frequency $f_1$ is required in order to eliminate the jitter from the reproduced chroma signal, causing the chroma signal recording and reproducing circuit to become complicated when it is fabricated into an integrated circuit.

Figure 2:
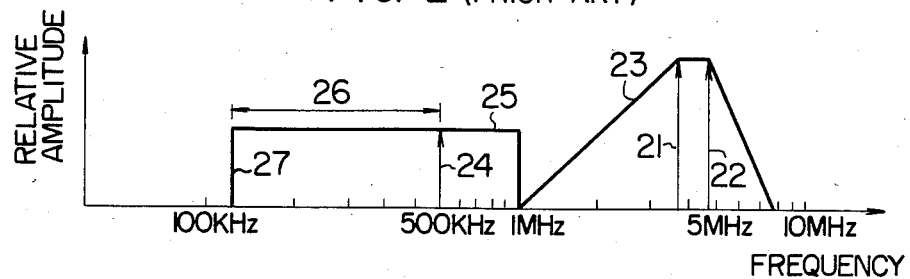
FIG. 2 is a frequency spectrum diagram for the recording signal in the conventional magnetic recording and reproducing apparatus.

FIG. 2 is a relative amplitude vs. frequency graph showing the frequency distribution of the recording chroma signal and the frequency-modulated luminance signal obtained by processing the CCIR color television signal in accordance with the first chroma signal transformation system. In the figure, the locations indicated by the arrows 21 and 22 show the frequency of the sync signal (3.8 MHz) and the white peak level frequency (5.1 MHz) of the frequency-modulated luminance signal, while a portion indicated by 23 is the associated harmonic section. The location indicated by 24 is the frequency $f_4$ of the recording chroma signal set to $40f_H = 625$ kHz approximately. The portions indicated by 25 and 26 are the band and the lower side band of the recording chroma signal, and the location indicated by 27 is the lower cutoff frequency of the signal. It is known that the chroma signal usually needs a band width of ±500 kHz or more, and thus the lower cutoff frequency indicated by 27 becomes $f_{LOW} = 625$ kHz − 500 kHz = 125 kHz.

Figure 3:
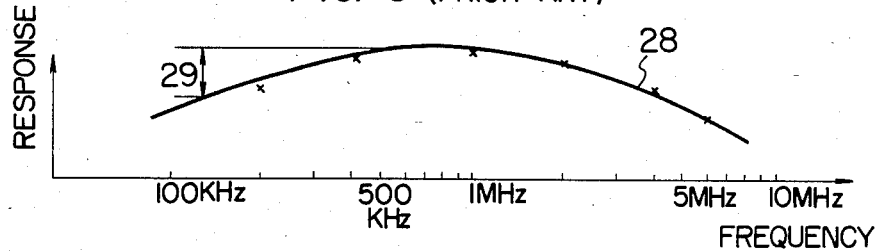
FIG. 3 is a frequency response diagram for the conventional magnetic recording and reproducing apparatus.

FIG. 3 shows the typical frequency response of the magnetic recording and reproducing apparatus, where the response curve 28 has the peak at around 1 MHz. Reference number 29 shows the sag of the amplitude characteristics against the lower side band of the recording chroma signal, indicating an attenuation of about 10 dB at 125 kHz relative to 625 kHz. This deteriorates the transient response of the chroma signal, resulting in a significant deterioration in the quality of the reproduced picture, as is known in the field of art. On this account, the prior art recording and reproducing system employs a compensation circuit to modify the frequency response, however, it is not enough to obtain a satisfactory result.

Figure 4:
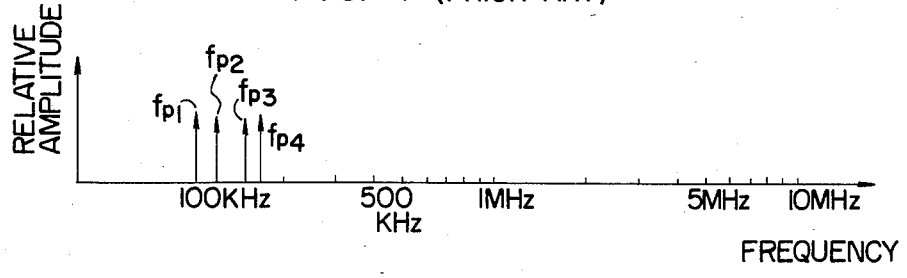
FIG. 4 is a frequency spectrum diagram for the pilot signals.

Also there has been the prior art technology in which pilot signals are recorded on a multiplex basis with the video signal in order to enhance the tracking performance for the high density recording. FIG. 4 shows frequencies of the pilot signals, where the relative amplitude of separate four pilot signals $f_{p1}$, $f_{p2}$, $f_{p3}$ and $f_{p4}$, which are generally needed, are plotted against the frequency. These frequencies are chosen outside the recording chroma signal band so as to prevent interference with the video signal, and set to around 100 kHz for the lowest one in consideration of the response of the recording and reproducing system shown in FIG. 3. Specifically, in general, the first pilot signal is set to $f_{p1} = 6.5f_H = 102$ kHz, the second pilot signal $f_{p2} = 7.5f_H = 117$ kHz, the third pilot signal $f_{p3} = 9.5f_H$, and the fourth pilot signal $f_{p4} = 10.5f_H = 164$ kHz. However, since the lower cutoff frequency $f_{LOW}$ of the recording chroma signal is 125 kHz in the prior art system as shown in FIG. 2, pilot signals cause an interference with the recording chroma signal. In addition, in order to provide a frequency separation between the pilot signals and the recording chroma signal, the lower cutoff frequency of the recording chroma signal needs to be set to around 164 kHz. This causes the recording chroma signal to have the lower side band 26 of a maximum of 461 kHz, resulting in a further deterioration of the picture quality, making it extremely difficult to practice the system.

The above-mentioned pilot signals must have each accurate frequency when considered to provide interchangeability of the tape, and this can be achieved by producing the pilot signals by dividing the output frequency of the VCO 10 shown in FIG. 1. In this case, when the frequency divider 9 is assumed to be a ¼ divider and the VCO 10 to provide a frequency of $160f_H$, approximate frequencies for the four pilot signals can be obtained by dividing the frequency of the VCO 10 by 1/24, 1/21, 1/17 and 1/15, respectively. Thus the first pilot signal will have a frequency of $f_{p1} = 160f_H/24 = 6.67 f_H$, the second pilot signal $f_{p2} = 160f_H/21 = 7.62f_H$, the third pilot signal $f_H = 160f_H/17 = 9.41f_H$, and the fourth pilot signal $f_H = 160f_H/15 = 10.67f_H$.

The conditions for the pilot signal frequencies are expressed by the following equations.

$$(f_{p2} - f_{p1}) = (f_{p4} - f_{p3}) = f_H \quad (1)$$

$$(f_{p3} - f_{p1}) = (f_{p4} - f_{p2}) = 3f_H \quad (2)$$

The above mentioned frequencies give, $$f_{p2} - f_{p1} = 0.95f_H \quad (3)$$

$$f_{p4} - f_{p3} = 1.26f_H \quad (4)$$

$$f_{p3} - f_{p1} = 2.94f_H \quad (5)$$

$$f_{p4} - f_{p2} = 3.05f_H \quad (6)$$

The differences between ($f_{p2} - f_{p1}$) and ($f_{p4} - f_{p3}$), and between ($f_{p3} - f_{p1}$) and ($f_{p4} - f_{p2}$) are both 0.31 $f_H$, that does not satisfy the conditions given by equations (1) and (2). Therefore, it is necessary to provide a stable oscillator, e.g., a crystal oscillator, in addition to the VCO 10.

Figure 5:
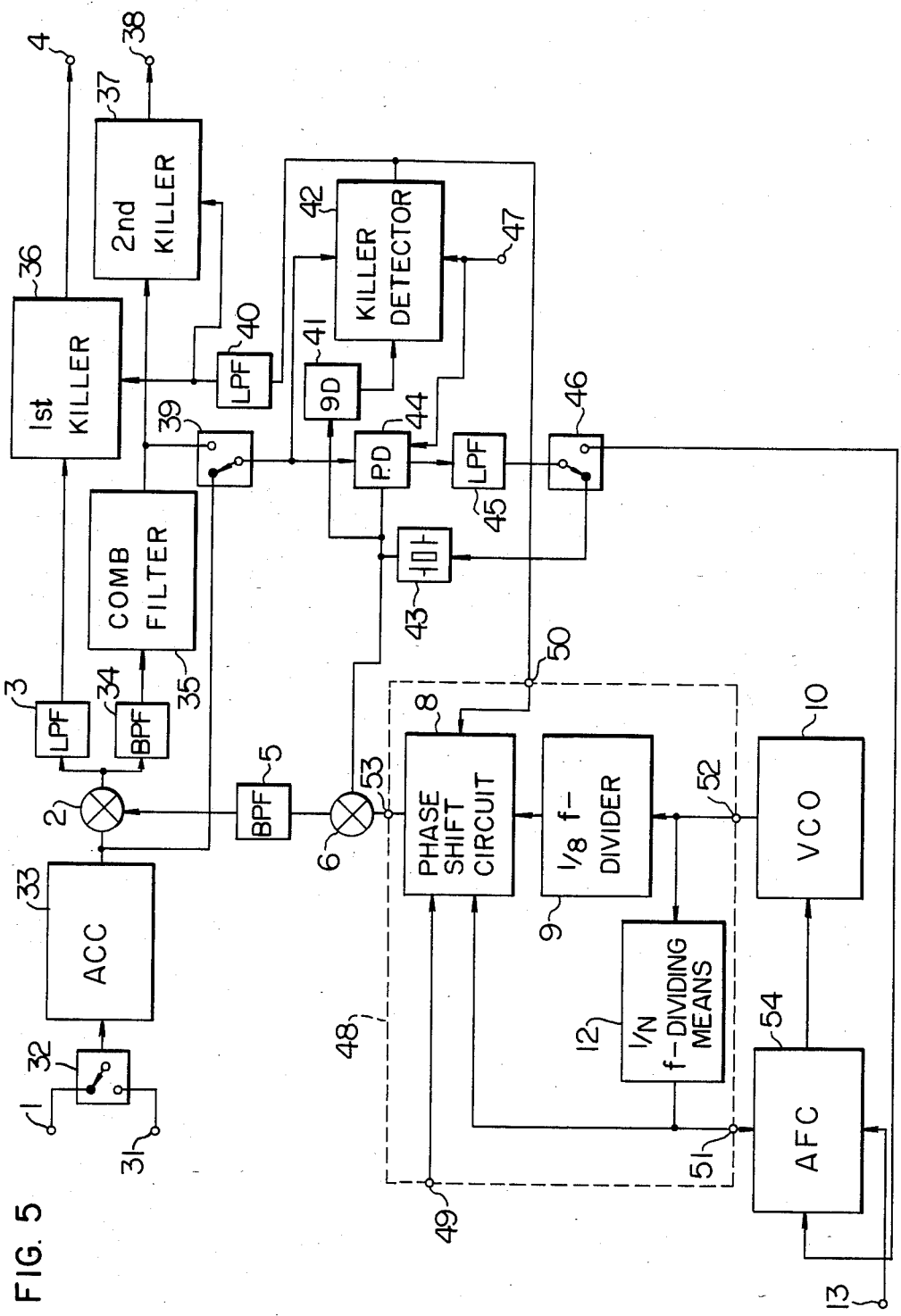
FIG. 5 is a block diagram showing the chroma signal frequency converting circuit in the color video signal recording apparatus embodying the present invention.

FIG. 5 is a block diagram showing one embodiment of the color video signal recording apparatus according to the present invention. The arrangement includes an input terminal 1 for receiving the recording chroma signal connected to one of the fixed contacts of the first switch 32, and a reproduced chroma signal input terminal 31 for receiving the chroma signal separated from the color television signal recorded on the magnetic tape during the playback operation, the terminal 31 being connected to another fixed contact of the first switch 32. The moving contact of the switch 32 is connected to the input terminal of ACC (Automatic Chroma-Gain Control) circuit 33 which has the output terminal connected to one input terminal of the second frequency converter 2 and also to one fixed contact of the second switch 39. Another input terminal of the second frequency converter 2 is connected to the output terminal of band-pass filter 5, and the output terminal of the frequency converter 2 is connected to the input terminals of low-pass filter 3 and band-pass filter 34. The low-pass filter 3 has its output terminal connected to the input terminal of the first color killer amplifier 36, and the band-pass filter 34 has its output terminal connected to the input terminal of comb line filter 35. The first color killer amplifier 36 has a control terminal connected to the output terminal of a low-pass filter 40 and an output terminal connected to the output terminal 4 of the recording chroma signal. The comb line filter 35 has its output terminal connected to another fixed contact of the second switch 39 and also to the input terminal of the second color killer amplifier 37. The second color killer amplifier 37 has a control terminal connected to the output terminal of the low-pass filter 40 and an output terminal connected to the output terminal 38 for the reproduced chroma signal. The moving contact of the second switch 39 is connected to one input terminal of phase shift circuit 44 and also to the first input terminal of a killer detector 42. The phase detector 44 has another input terminal connected to the output terminal of the first oscillator 43 and an output terminal connected through low-pass filter 45 to the moving contact of the third switch 46. The first oscillator 43 has its input terminal connected to one fixed contact of the third switch 46 and an output terminal connected to one input terminal of the first frequency converter 6 and also through 90° phase shift circuit 41 to the second input terminal of the killer detector 42. The killer detector 42 has the third input terminal connected to the input terminal 47 for the burst gate pulse and an output terminal connected to the input terminal of the low-pass filter 40 and also through the first input terminal 50 of lower carrier generator 48 to the first input terminal of phase selection circuit 8. The second oscillator 10 is of a voltage controlled oscillator having its input terminal connected to the output terminal of horizontal AFC circuit 54 and an output terminal connected through the second input terminal 52 of the lower carrier generator 48 to the input terminal of the first frequency divider 9 and the input terminal of the second frequency divider 9. The horizontal AFC circuit 54 has its first input terminal connected through the second output terminal 51 of the circuit 48 to the output terminal of the second frequency divider 12, and the second input terminal connected to another fixed contact of the third switch 46, and further the third input terminal connected to the horizontal sync pulse input terminal 13. The phase selection circuit 8 has its input terminal connected to the output terminal of the first frequency divider 9, the third input terminal connected to the output terminal of the second frequency divider 12, and the fourth input terminal connected to the head pulse input terminal 49 of the circuit 48. The phase selection circuit 8 has its output terminal connected to another input terminal of the first frequency converter 6, the output terminal of which is connected to the input terminal of the band-pass filter 5.

The following will first describe the operation of recording the CCIR color television signal by the foregoing circuit arrangement.

In the recording mode, the first switch 32, second switch 39 and third switch 46 are positioned as shown in the figure, and the color signal with a carrier frequency of $f_1$ is supplied to the input terminal 1. The chroma signal is controlled by the ACC circuit 33 to have a constant amplitude, then conducted to the second frequency converter 2 and the second switch 39. The chroma signal fed to the second converter 2 is subjected to frequency conversion by the carrier signal $f_2$ supplied from the BPF 5, and the chroma signal reduced to the lower frequency $f_4$ is extracted at the output terminal of the LPF 3. The lower chroma signal is conducted through the color killer circuit 36 and sent out from the output terminal 4. The chroma signal fed to the second switch 39 is conducted to the phase detector 44 and the killer detector 42. The phase detector 44 detects the phase of the burst signal, and constituted a phase-locked loop (PLL) circuit in conjunction with the LPF 45 and the first oscillator 43 so as to stabilize the oscillation frequency of the first oscillator 43. The killer detector 42 detects the burst signal for discriminating the color and monochrome signals and provides the discrimination signal for the first and second color killer circuits 36 and 37 through the LPF 40 so as to cut off the outputs of the color killer circuits 36 and 37 when processing a monochrome signal.

The output signal of the second VCO 10 is reduced by the first frequency divider 9 to the carrier frequency $f_4$ of the lower chroma signal, and it is supplied to the phase selection circuit 8. The phase selection circuit 8 controls the phase of the recording chroma signal in every 1H period in accordance with the head switching pulse supplied to the head pulse input terminal 49, i.e., providing a phase-lead or phase-lag by 90° in every 1H period for recording the first field, and recording the lower chroma signal without phase shifting for the second field. The shifted output signal from the phase selection circuit 8 is multiplied by the first converter 6 by the output signal of the first oscillator 43 which operates at a center frequency of $f_1$, and the carrier signal $f_2$ having a frequency which is the sum of the given frequencies is obtained at the output terminal of the BPF 5. The carrier signal $f_2$ further multiplied by the second converter 2 by the color signal with the carrier frequency $f_1$, and the lower chroma signal with the carrier frequency $f_4$ is obtained as the difference of the given frequencies. The output signal from the second oscillator 10 is fed through the second frequency divider 12 to the horizontal AFC circuit 54 so that it is compared with the phase of the horizontal sync pulse separated from the input video signal at the input terminal 13 or the equivalent signal. Thus the oscillator 10 in conjunction with the second frequency divider 12 and horizontal APO circuit 54 constitutes a PLL for providing a frequency which is a multiple of the horizontal signal frequency in accordance with the division factor of the second frequency divider 12.

During playback mode, the three switches 32, 39 and 46 are positioned oppositely to the case shown in the figure. The input terminal 31 receives the color signal retrieved from the magnetic tape, and this signal is subjected to phase-lead or phase-lag by 90° in every 1H period for reproducing the first field, and is not shifted for reproducing the second field. The horizontal sync pulse input terminal 13 receives the horizontal sync pulse separated from the reproduced luminance signal or the equivalent signal, causing the second oscillator 10 to operate at the same frequency as in recording mode. The first frequency divider 9 and phase selection circuit 8 operate on the output of the oscillator 10 to have a phase-lead or phase-lag by 90° in each 1H period for reproducing the first field, and provide no phase shifting for reproducing the second field, as in the case of recording mode, whereby the phase shift which has been made in the recording process can be compensated.

On the other hand, the first oscillator 43 operates at $f_1$ in a free-run condition. The output of the first oscillator 43 is compared with the burst signal in the output signal from the second converter 2 by the phase detector 44, and the resultant output voltage is used to control the oscillation frequency of the second oscillator 10 through the horizontal AFC 54, so that the carrier frequency of the reproduced chroma signal is stabilized.

The chroma signal with its phase and frequency restored to the original ones by the second converter 2 is supplied through the BPF 34 to the comb line filter 35 so that the crosstalk component caused by adjacent video tracks is eliminated from the chroma signal. Then the chroma signal without crosstalk component is delivered to the output terminal 38 through the second color killer amplifier 37 which is controlled by the killer detector 42.

The following will describe the arrangement of the lower carrier generator and second oscillator shown in FIG. 5. There are the following conditions of the chroma signal frequency when recording the chroma signal of NTSC and CCIR systems.

The color signal of NTSC system must have:
(1) An offset frequency which is an odd multiple of $\frac{1}{4} f_H$.
(2) An offset frequency which is an odd multiple of $\frac{1}{2} f_H$ between fields.

The color signal of CCIR system must have:
(3) An offset frequency which is an odd multiple of $\frac{1}{8} f_H$.
(4) An offset frequency which is an odd multiple of $\frac{1}{4} f_H$ between fields.

Among the above conditions, in order to meet the second and fourth conditions in NTSC system, the color signal is phase-shifted by $+90°$ in every horizontal scanning period for the first field, and by $-90°$ for the second field, thereby providing an offset frequency of $\frac{1}{2} f_H$ between the first and second fields; or the color signal is phase-shifted by $180°$ in every horizontal scanning period for either the first or second field, thereby providing an offset frequency of $\frac{1}{2} f_H$ between the fields. In the CCIR system, the color signal is phase-shifted by $90°$ in every horizontal period for either the first or second field, thereby providing an offset frequency of $\frac{1}{4} f_H$ between the first and second fields.

In order to meet the first and third conditions in the NTSC system, the color signal is phase-shifted by $\pm 90°$ for each field, thereby providing an offset frequency of $\pm \frac{1}{4} f_H$ between the fields; or for the case of shifting the phase by $180°$ only for one of the fields, the frequency of the input signal to the phase shift circuit is chosen to be $\{n \pm \frac{1}{4}(2l-1)\} f_H$ (where n and l are constants), and an offset frequency which is an odd multiple of $\frac{1}{4} f_H$ can be achieved. It is also possible for the CCIR system to have an offset frequency of $\frac{1}{8} f_H$, by setting the frequency of the input signal to the phase shift circuit to, for example, $(M-\frac{1}{8})f_H$ (where M is an integer).

Thus the chroma signal in the NTSC system must have an offset frequency which is an odd multiple of $\frac{1}{4} f_H$ relative to the horizontal sync signal, and the chroma signal in the CCIR system must have an offset frequency of $\frac{1}{8} f_H$ relative to the horizontal sync signal. In order to provide for the CCIR chroma signal an offset frequency which is an odd multiple of $\frac{1}{8} f_H$, the output frequency of the phase shift circuit may be set to $(M\pm\frac{1}{8})f_H$, and the NTSC chroma signal can have an offset frequency which is an odd multiple of $\frac{1}{4} f_H$ by setting the output frequency of the phase shift circuit to $(M\pm 2/8)f_H$. Such an offset frequency can be produced in the arrangement of FIG. 5 by making the first frequency divider 9 for dividing the output frequency of the oscillator 10 to be a $\frac{1}{8}$ frequency divider. Thus the signal supplied to the phase selection circuit 8 has a frequency of $(M\pm\frac{1}{8})f_H$ or $(M\pm 2/8)f_H$. With the first frequency divider 9 being of a $\frac{1}{8}$ divider, the oscillator 10 provides for the CCIR chroma signal a frequency which is a multiple of $8\times(M\pm\frac{1}{8})f_H=(8M\pm 1)f_H$. The PLL oscillator 10 has within its loop the second frequency divider 12, which divides the oscillation frequency of the oscillator 10 by N and matches the phase of the output of the oscillator 10 to that of the horizontal sync signal. Then the oscillation frequency of the oscillator 10 has a relationship of $N \cdot f_H$. By choosing the oscillation frequency of the oscillator 10 to be $(8M\pm 1)f_H=N\cdot f_H$, the value of N becomes an odd number. Accordingly, the value of N can be resolved by 3 which is the minimum prime number for odd numbers. This can be achieved by combination of a $\frac{1}{3}$ divider for the second frequency divider 12 and other frequency dividers having respective division factors, and only the $\frac{1}{3}$ divider needs to be the high-speed divider.

Similarly, for the NTSC chroma signal, the oscillation frequency of the oscillator 10 becomes a frequency which is an integer of $8\times(M\pm 2/8)f_H=(8M\pm 2)f_H$, and this is an even multiple of $f_H$. Accordingly, by choosing the frequency which is an even multiple of $f_H$ so that it can be resolved by 3, the $\frac{1}{3}$ divider for the second frequency divider 12 can be used. Thus both the first and second frequency dividers 9 and 12 can be used for both the NTSC and CCIR systems. The following will describe the recording process for the CCIR chroma signal in accordance with $+90°$ phase shift system. For recording the CCIR chroma signal, the phase selection circuit 8 does not make a phase shift for the second field, but makes a $+90°$ phase shift for the first field so as to provide a chroma frequency difference of $f_H/4$ between the fields. In order for the recording chroma signal to have an offset frequency of $\frac{1}{8} f_H$, the output frequency of the $\frac{1}{8}$ frequency divider 9 must be $(M-\frac{1}{8})f_H$ (where M is an integer), and then the output frequency of the phase selection circuit 8 becomes $(M\pm\frac{1}{8})f_H$. Assuming $M=44$, the output frequency of the oscillator 10 becomes $(44-\frac{1}{8})\times 8 f_H=351 f_H$. Accordingly, the second frequency divider 12 can be formed by combination of a $\frac{1}{3}$ divider and a 1/117 divider.

The following will describe an embodiment for recording the NTSC chroma signal in accordance with $\pm 90°$ shift system. The phase selection circuit 8 provides a $+90°$ phase shift for the carrier signal in every horizontal scanning period for the first field, and provides a $-90°$ phase shift in every horizontal scanning period for the second field, thereby realizing an offset frequency of $\pm\frac{1}{4} f_H$ and a chroma frequency difference of $\frac{1}{2} f_H$ between the fields. Therefore, the output frequency of the 1/8 frequency divider 9 must be a multiple of $f_H$. Assuming the output frequency of the $\frac{1}{8}$ frequency divider to be $45 f_H$ which is a multiple of 3, the output frequency of the VCO 10 becomes $45\times 8 f_H=360 f_H$, and the second frequency divider 12 is formed by combination of a $\frac{1}{3}$ divider and a 1/120 divider.

When the arrangement is realized by a common integrated circuit for both the NTSC and CCIR systems, it will have a switch for the phase selection circuit 8 and a switch for the second frequency divider 12 to perform as a 1/120 divider and a 1/117 divider. The oscillation frequency of the oscillator 10 is $360 f_H=5.7$ MHz for the NTSC system and $351 f_H=5.5$ MHz for the CCIR system. The second frequency divider 12 as the 1/120 and 1/117 dividers will have an input frequency in the range of 1.8 to 1.9 MHz, and the divider for switching 1/120 and 1/117 can be arranged entirely using $I^2L$ devices, whereby the increased chip size and power consumption can be prevented. Both factors can be developed as $1/120=\frac{1}{2}\times\frac{1}{2}\times\frac{1}{2}\times\frac{1}{3}\times 1/5$, and $1/117=\frac{1}{3}\times\frac{1}{3}\times 1/13$, thus numbers 120 and 117 have a common prime number of 3. The frequency divider 12 can be arranged separately using two $\frac{1}{3}$ dividers plus a 1/40 divider for the NTSC system and a 1/39 divider for the CCIR system. More specifically, the frequency divider 12 is arranged with the first $\frac{1}{3}$ divider section made up of two high-speed flip-flops operating at 5.5 to 5.7 MHz, the second $\frac{1}{3}$ divider made up of two medium-speed flip-flops operating at 1.8 to 1.9 MHz, and a divider made up of six or more low-speed flip-flops operating at 0.6 MHz for providing selectively the division factor of 1/39 and 1/40. The low-speed flip-flops can have a smaller chip size and lower power consumption as compared with medium-speed flip-flops.

Figure 6:
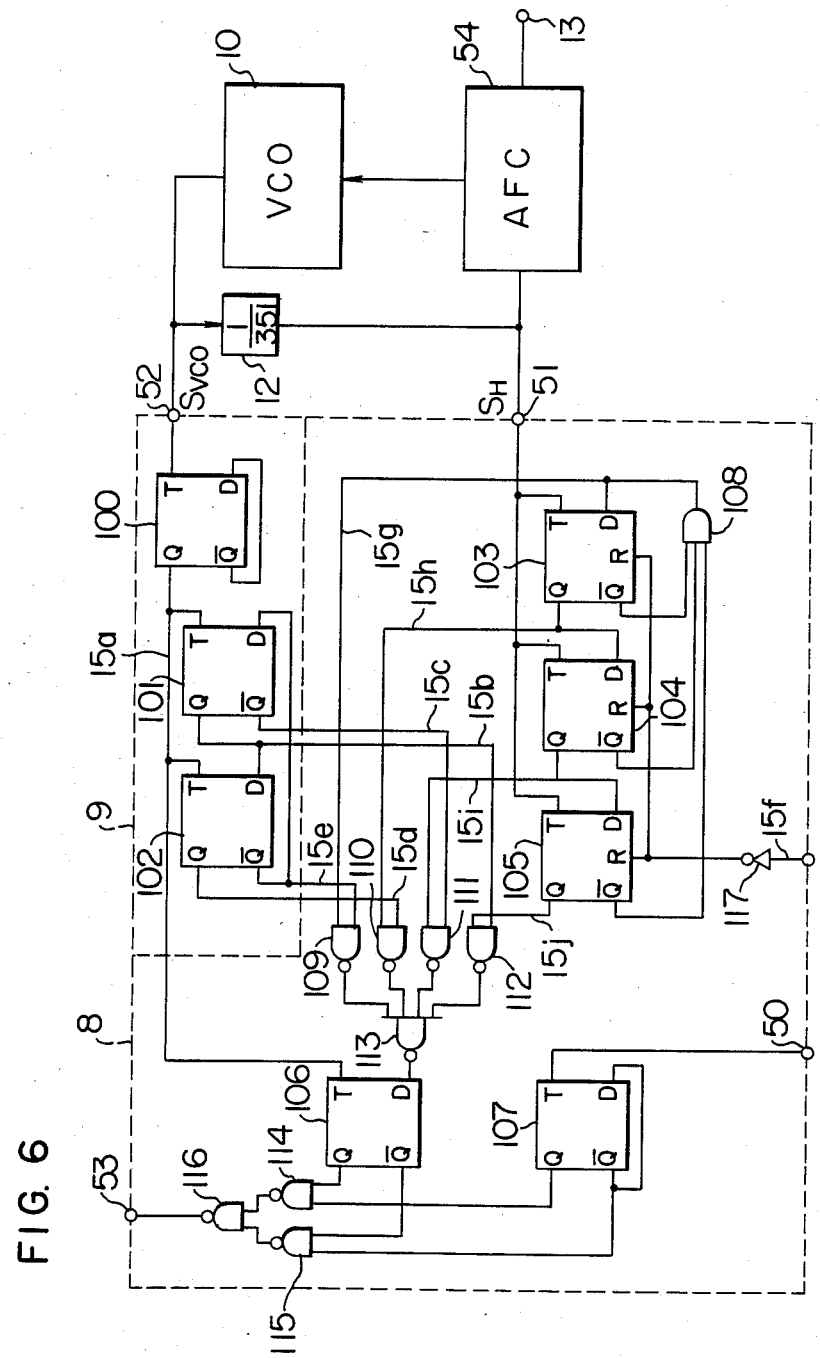
FIG. 6 is a schematic diagram of the $\frac{1}{8}$ frequency divider embodying the present invention.

The following will describe in detail with reference to FIG. 6 an embodiment of the lower carrier generator used in the arrangement of FIG. 5. In the following description, the frequency f3 of the lower carrier is assumed to be chosen as $f_3 = (44 - \frac{1}{8})f_H$ (i.e., n=44) for explanatory purposes, but of course the present invention is not limited to this condition. In FIG. 6, components with the same reference numbers as those of FIG. 5 are the same as mentioned previously. The arrangement includes D-type flip-flops 100 through 107, an AND gate 108, NAND gates 109 through 116, and an inverter 117.

The second oscillator 10 constitutes a PLL circuit in conjunction with the second frequency divider 12 and the horizontal AFC circuit 54, so that the oscillation frequency of the second oscillator 10 is controlled to $f_{VCO} = j\,f_H$ provided that the frequency divider 12 has a division factor of $1/j$. The value of j is chosen to be $j = 8 \times (44 - 1) = 351$ so that the lower carrier has the specified frequency of $(44 - \frac{1}{8})f_H$.

The flip-flops 100–102 form the first frequency divider 9, providing signals 15b, 15c, 15d and 15e which are the divided frequency signal of $f_{VCO}$ from the second oscillator 10 generating the oscillation frequency of $f_{VCO} = 8(44 - 1)f_H$. The signals 15b–15e have a phase difference of 90° from each other with the frequency being of $\frac{1}{8} \times f_{VCO} = (44 - \frac{1}{8})f_H$. The flip-flops 103–105 are enabled when the head pulse input terminal 49 is at 1's level in recording or reproducing a track of the first field for dividing output signal SH from the second frequency divider 12, i.e., the equivalent horizontal sync pulse, by 4, and provides signals 15g, 15h, 15i and 15j which become 1's level one by one sequentially in every 1H period. Then, one of the signals with the 90° phase difference from each other is selected by the NAND gates 109, 110, 111 and 112 in each 1H period in the order of 15e, 15d, 15c and 15b, and outputted at the output of the NAND gate 113. The flip-flop 106 operates to adjust the time delay caused by the NAND gates 109–113. The flip-flop 107 makes a transition each time the phase correction signal input terminal 50 receives a 1's pulse so as to pass the signal at terminal Q of $\overline{Q}$ of the flip-flop 106 to the lower carrier output terminal 53. On the other hand, when a track of the second field is recorded or reproduced with the head pulse input terminal 49 being of 0' level, the flip-flops 103–105 are kept reset, providing the output 5g at 1's level, and the NAND gate 109 is enabled. Then, the lower carrier output terminal 53 provides the signal equivalent to the signal 15b so as to control the phase of the lower color signal as described previously.

Figure 7:
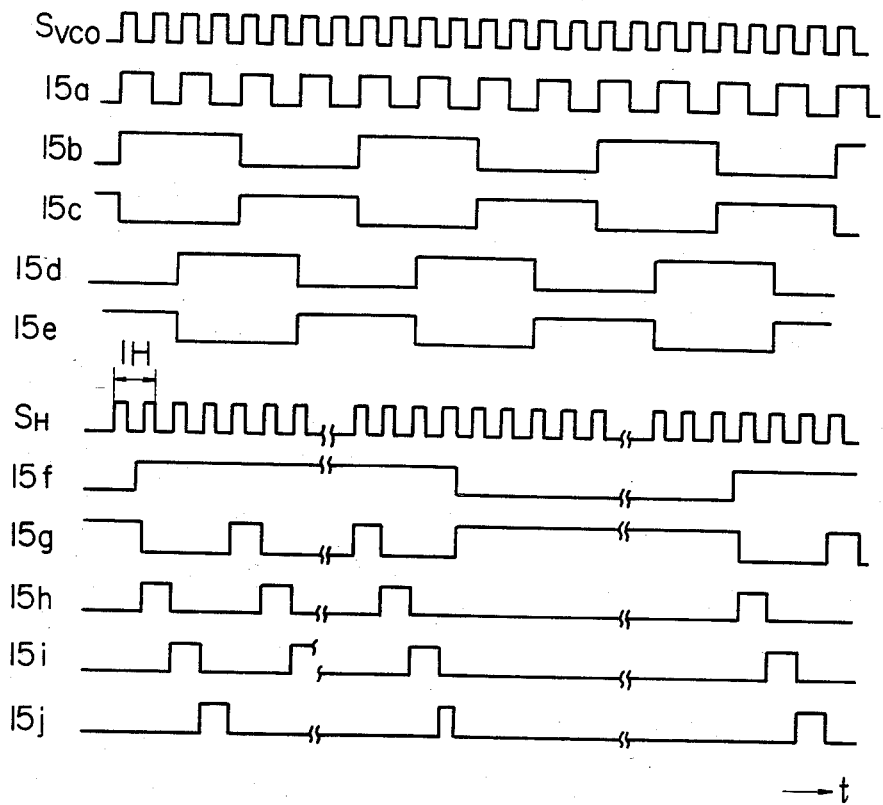
FIG. 7 is a set of waveform charts showing the operaton of the circuit arrangement shown in FIG. 7.

FIG. 7 shows the timing relationship of the principal signals shown in FIG. 6. Signal $S_{VCO}$ is the output of the oscillator 10, and 15a is the output of the first flip-flop 100, i.e., the $\frac{1}{2}$ divided waveform of the oscillator output. Signals 15b–15e are $\frac{1}{4}$ divided waveforms of 15a from the first flip-flop 100, showing the phase difference by 90° from each other. SH is the signal equivalent to the horizontal sync pulse, and is supplied to the input terminal 51. Signal 15f is the head pulse supplied to the input terminal 49, 15g is the output of the AND gate 108, 15h is the Q-output of the flip-flop 103, 15i is the Q-output of the flip-flop 104, and 15j is the Q-output of the flip-flop 105.

Figure 8:
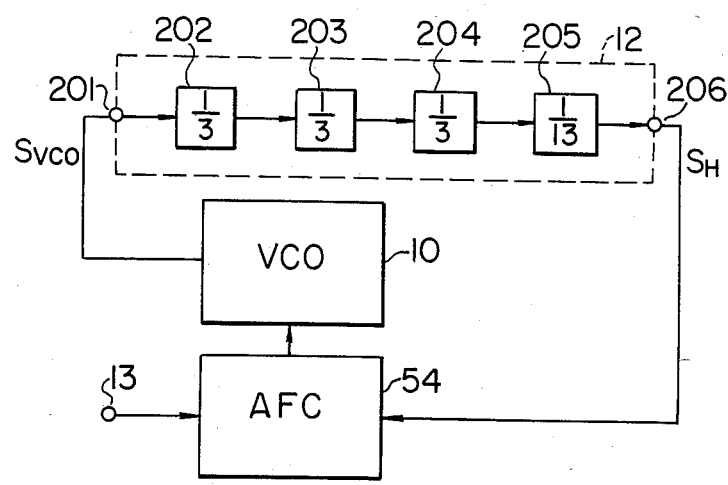
FIG. 8 is a block diagram exemplifying the 1/N frequency divider.

FIG. 8 shows an embodiment of the second frequency divider 12 where components with the same reference numbers as shown in FIG. 5 are identical. The arrangement includes an input terminal 201 for receiving the output signal from the second oscillator 10, the third, fourth and fifth $\frac{1}{3}$ frequency dividers, a 1/13 frequency divider, and an output terminal 206 for the frequency divided signal.

The division factor of the second frequency divider 12 is determined from the division factors of the dividers 202–205, and in this case it is $\frac{1}{3} \times \frac{1}{3} \times \frac{1}{3} \times 1/13 = 1/351$. The third $\frac{1}{3}$ frequency divider 202 receives the input frequency which is identical to the oscillation frequency of the second oscillator 10, i.e., $f_{VCO} = 351\,f_H \approx 5.5$ MHz, thus requiring a very high-speed logic element. The fourth $\frac{1}{3}$ frequency divider 203 receives the output of the third $\frac{1}{3}$ divider 202, i.e., 1.8 MHz approximately, and it can be arranged using a medium-speed logic element. The fifth $\frac{1}{3}$ divider 204 receives the output of the fourth $\frac{1}{3}$ divider 203, i.e., 0.6 MHz approximately, and it can be arranged using a low-speed logic element as for the 1/13 frequency divider.

Figure 9:
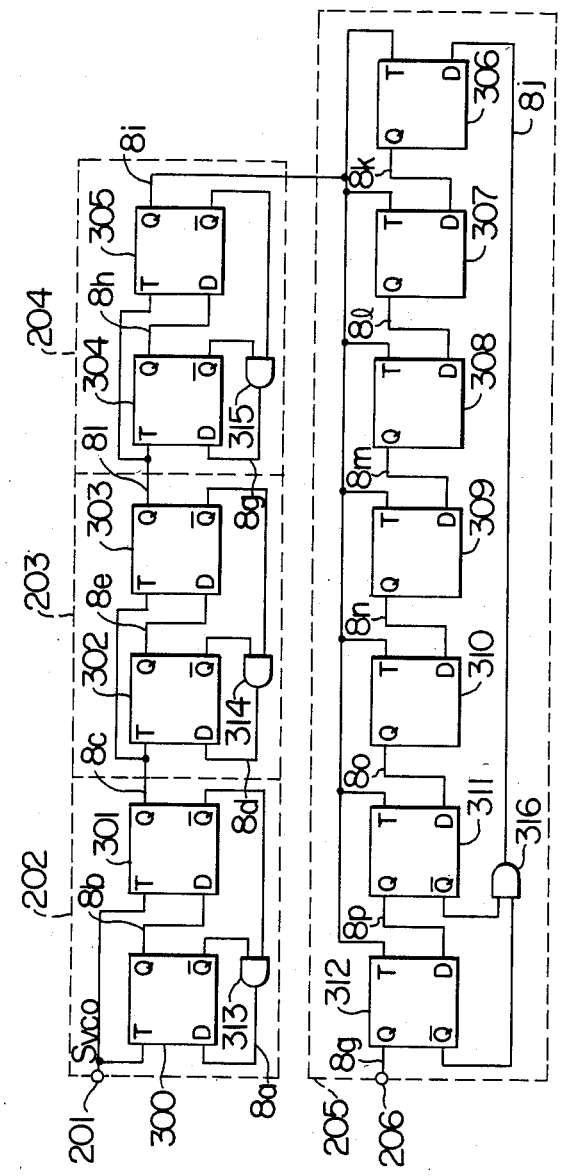
FIG. 9 is a schematic diagram exemplifying the 1/N frequency divider.

FIG. 9 shows in detail an embodiment of the second frequency divider 12 shown in FIG. 8, where components with the same reference numbers as shown in FIG. 8 are identical.

The arrangement includes flip-flops 300 through 312 and AND gates 313 through 316. The output signal $S_{VCO}$ of the second oscillator 10 which generates the frequency $f_{VCO}$ is received by terminal T of the flip-flops 300 and 301 constituting the third $\frac{1}{3}$ frequency divider 202. A signal 8c having a frequency of $f_{VCO}/3$ is produced at terminal Q of the flip-flop 301 and it is fed to terminal T of the flip-flops 302 and 303 constituting the fourth $\frac{1}{3}$ frequency divider 203. The flip-flop 303 produces at its Q terminal a signal 8f having a frequency of $f_{VCO}/9$, and it is conducted to terminal T of the flip-flops 304 and 305 constituting the fifth $\frac{1}{3}$ frequency divider 204. The flip-flop 305 produces at its Q terminal a signal 8i having a frequency of $f_{VCO}/27$, and it is conducted to terminal T of the flip-flops 306–312 constituting the 1/13 frequency divider 205. Finally, the flip-flop 312 produces at its Q terminal a signal 8q having a frequency of $f_{VCO}/351$ and delivers it to the divided signal output terminal 206.

Figure 10:
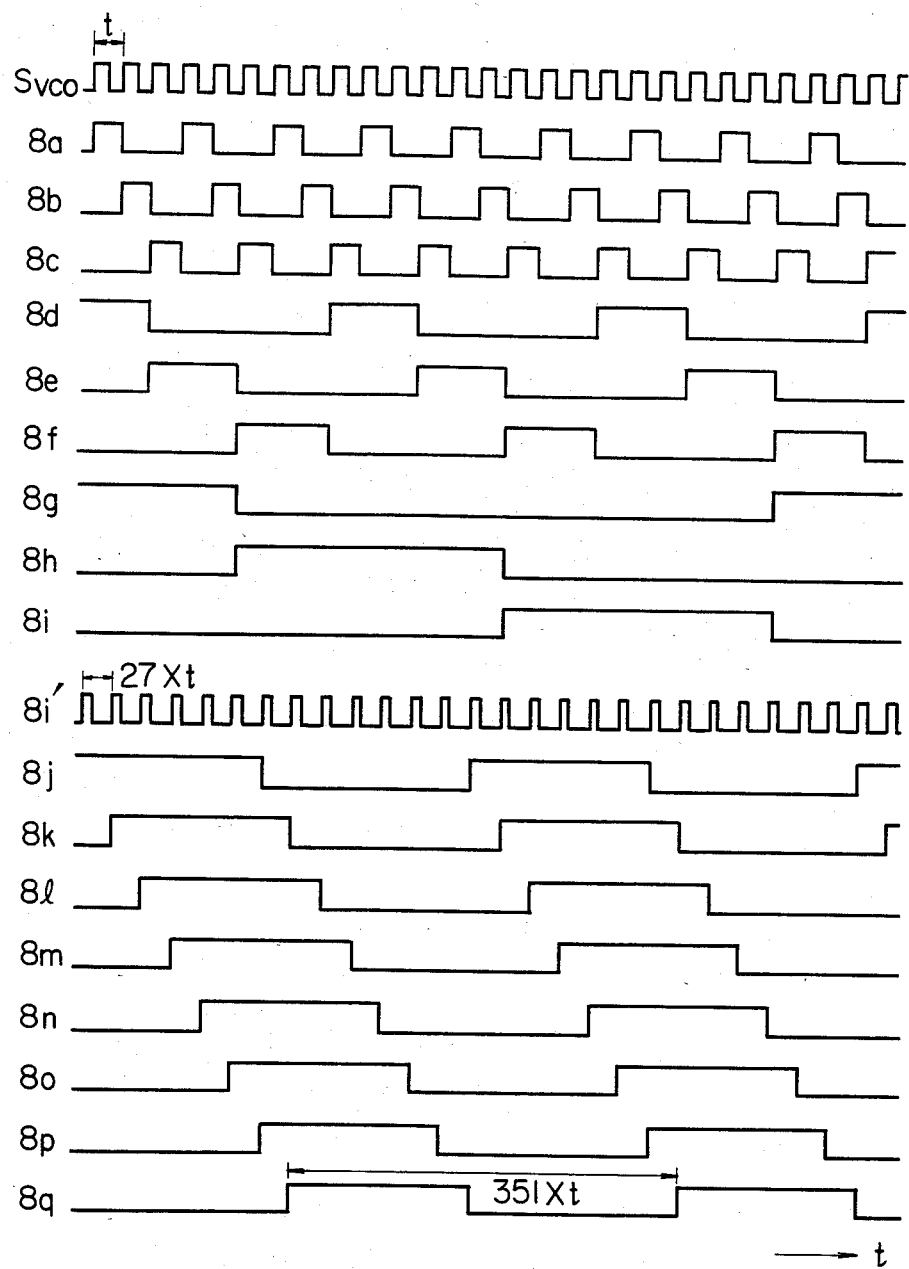
FIG. 10 is a set of waveform charts showing the operation of the circuit arrangement shown in FIG. 9.

FIG. 10 is a timing chart for the principal signals shown in FIG. 9. $S_{VCO}$ is the output signal of the second oscillator 10, 8a–8c are the signal waveforms at the output of the AND gate 313 and terminal Q of the flip-flops 300 and 301, respectively, 8d–8f are the signal waveforms at the output of the AND gate 314 and terminal Q of the flip-flops 302 and 303, respectively, 8g–8i are the signal waveforms at the output of the AND gate 315 and terminal Q of the flip-flops 304 and 305, respectively. Signal 8i' is the same as signal 8i, but plotted on the contracted time scale, and it has a period of 27t relative to period t of $S_{VCO}$. Signals 8j–8q are the outputs of the AND gate 316 and the flip-flops 306–312 at their Q terminal.

It will readily be understood from FIGS. 8 and 9 that only the flip-flops 300 and 301 and the AND gate 313 need a high-speed logic element.

Figure 11:
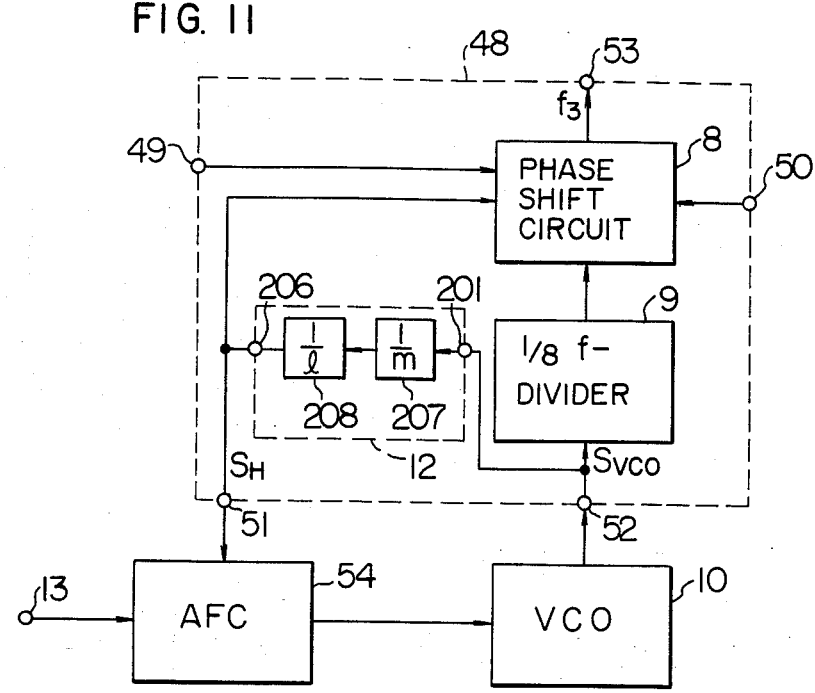
FIG. 11 is a block diagram showing another embodiment of the 1/N frequency divider.

As mentioned previously, in the embodiments of FIGS. 8 and 9, the oscillation frequency of the second oscillator 10 is set to $f_{VCO} = 351\,f_H$ merely for explanatory purposes, and the present invention is not limited to this case. Instead, the lower carrier generator 48 may be arranged in general as shown in FIG. 11, where components with the same reference numbers as shown in FIGS. 5 and 8 are identical. The arrangement of FIG. 11 includes a 1/m frequency divider 207 and a 1/l frequency divider 208. The oscillation frequency of the second oscillator 10 can be expressed by the AFC circuit 54 as follows.

$$f_{VCO} = m \cdot l \cdot f_H \quad (7)$$

The lower carrier frequency $f_3$ at the output terminal 53 for the CCIR chroma signal is $$f_3 = (n \pm \tfrac{1}{8}) f_H$$

In consideration of division factor $\tfrac{1}{8}$ of the first frequency divider 9, the oscillation frequency $f_{VCO}$ of the second oscillator 10 is $$f_{VCO} = (8n \pm 1) f_H \quad (8)$$

Accordingly, from equations (7) and (8), m and l are given as $$m \cdot l = 8n \pm 1 \quad (9)$$

$$l = \frac{8n \pm 1}{m}$$

The lower carrier frequency $f_3$ is determined by choosing the value of n and the polarity sign so that the value of l is a positive integer, with the value of m being 3, 5 or 7.

In the case of the NTSC chroma signal, the lower carrier frequency is generally determined as follows in order to reduce the beat interference by the lower chrominance signal to the luminance signal as in the case of the CCIR chroma signal.

$$f_3 = (n \pm \tfrac{1}{4}) f_H \quad (10)$$

Accordingly, the oscillation frequency of the second oscillator 10 in FIG. 11 is adjusted so as to meet the equation (10), and this is achieved by switching the division factor of the frequency divider 12. However, in order to provide a simple arrangement for the frequency dividers, it is obvious that the relation similar to equation (9) needs to be established between the oscillation frequency of the oscillator 10 and the division factor of the frequency divider 12. Particularly, when the chroma signal recording circuit is used commonly for the CCIR and NTSC signals, the 1/m divider 207 in the frequency divider 12 preferably has a common division factor for the NTSC and CCIR signals. This condition is met by provision of a $\tfrac{1}{3}$ divider for the 1/m frequency divider 207.

In the arrangement of FIG. 11 with provision of a $\tfrac{1}{8}$ divider for the frequency divider 9 and a $\tfrac{1}{3}$ divider for the 1/m frequency divider 207, the CCIR chroma signal can have an offset frequency which is an odd multiple of $\tfrac{1}{8} f_H$ by choosing the lower carrier frequency to be $\tfrac{3}{8} N f_H$ (where N is an odd number). For NTSC system, the recording chroma signal can have an offset frequency which is an odd multiple of $\tfrac{1}{4} f_H$ by choosing the lower carrier frequency to be $\tfrac{3}{8} N f_H$ (where N is an integer), and at the same time, choosing the value of N so that N/4 is an integer for shifting the phase by 90°, or choosing the value of N so that (3N−2)/4 is an integer for shifting the phase by 180°. Thus the 1/m divider 207 and the divider 9 can be used commonly for the CCIR and NTSC signals. In the previous example, condition M=44 has been adopted for recording the CCIR chroma signal. When this value is set to the condition of $\tfrac{3}{8} N \cdot f_H$, the value of N becomes 117, an odd number. When value M=45 which has been adopted for recording the NTSC chroma signal is set to the condition of $\tfrac{3}{8} N \cdot f_H$, the value of N becomes 120, an integer. The value of N/4 becomes 30, an integer, and the condition for the case of 90° phase shift is met.

Figure 12:
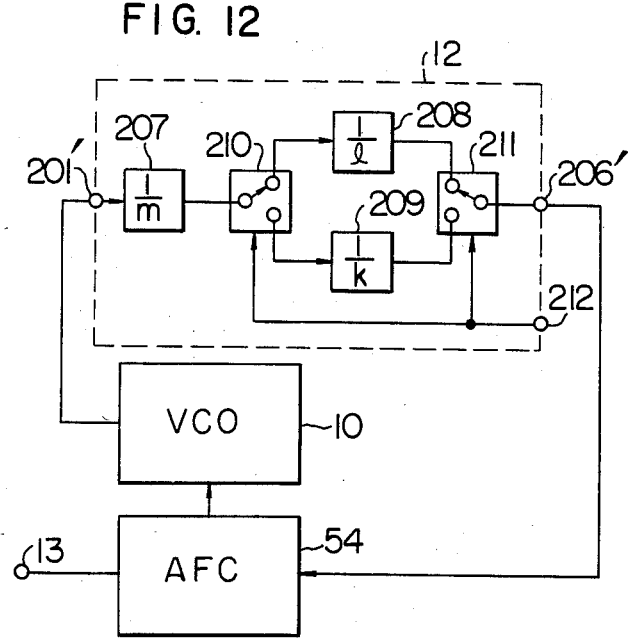
FIG. 12 is a block diagram of the 1/N frequency divider used in recording TV signals of the NTSC system and the CCIR system selectively.

FIG. 12 shows an embodiment of the lower carrier generator which is used commonly for the CCIR and NTSC signals, where components with the same reference numbers as shown in FIG. 11 are identical. The arrangement includes a 1/k frequency divider 209, switches 210 and 211, and a PAL/NTSC switching signal input terminal 212. For example, when the CCIR and NTSC lower carrier frequencies are chosen to be $(44 - \tfrac{1}{8}) f_H$ and $(47 + \tfrac{1}{4}) f_H$, respectively, the circuit parameters are set as m=3, l=117 and k=126. In CCIR mode, the PAL/NTSC switching signal at the input terminal 212 has a 1's level, providing the position of the switches 210 and 211 as shown in the figure, the division factor of the frequency divider 12 becomes 1/mxl=1/(3×117)=1/351 and the oscillation frequency of the oscillator 10 becomes 351 $f_H$.

Since the lower carrier frequency $f_3$ is produced by dividing the output frequency of the oscillator 10 by 8, it becomes $$f_3 = f_{VCI}/8 = 351/8 f_H = (44 - \tfrac{1}{8}) f_H$$

On the other hand, in NTSC mode, the input terminal 212 receives a 0's level, providing the position of the switches 210 and 211 oppositely to that of the figure, the division factor of the frequency divider 12 becomes 1/mxk=1/(3×126)=1/378 and the oscillation frequency of the oscillator 10 becomes 378 $f_H$. Accordingly, the lower carrier frequency $f_3$ becomes $$f_3 = (378/8) f_H = (47 + \tfrac{1}{4}) f_H$$

Figure 13:
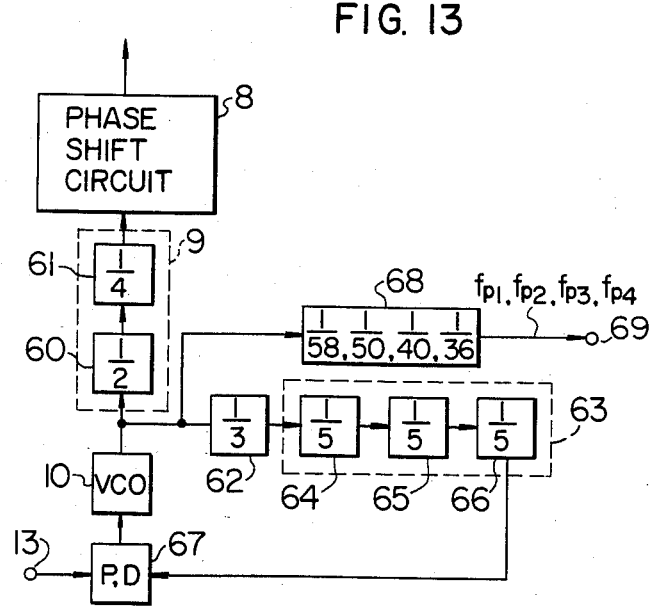
FIG. 13 is a block diagram showing another embodiment of the chroma signal frequency converting circuit for producing the pilot signals.

FIG. 13 shows another embodiment of the present invention, and this circuit is suitable for providing the pilot signals for recording the chroma signal of CCIR system. The output of the oscillator 10 is supplied to the frequency divider 9 which is made up of two frequency dividers 60 and 61. The former-stage divider 60 is a $\tfrac{1}{2}$ frequency divider, and the latter-stage divider 61 is a $\tfrac{1}{4}$ frequency divider. The output of the oscillator 10 is also supplied to $\tfrac{1}{3}$ frequency divider 62, which provides the output for another frequency divider 63 which is made up of three 1/5 frequency dividers 64, 65 and 66. The frequency dividers 62 and 63, the oscillator 10 and the phase detector 67 in combination constitute a PLL circuit. The output of the oscillator 10 is further supplied to the pilot signal generator 68, which has four frequency dividers, the first one being 1/58 divider, the second one 1/50 divider, the third one 1/40 divider, and the fourth one 1/36 divider. The output of the oscillator 10 is supplied commonly to the four frequency dividers in the pilot signal generator 68, and they perform frequency division and provide respective pilot signals $fp_1$, $fp_2$, $fp_3$ and $fp_4$ at the output terminal 69. The output of the frequency divider 9 is connected to the phase selection circuit 8.

The pilot signals must have frequencies satisfying the conditions given by equations (1) and (2). Preferably, the first pilot signal frequency $fp_1$ may be chosen to be 6.5 $f_H$, the second one 7.5 $f_H$, the third one 9.5 $f_H$, and the fourth one $10.5 f_H$. For recording the CCIR chroma signal, when the value of N is set to 125 so that the recording chroma frequency meets $\frac{3}{8} N f_H$, the recording chroma frequency becomes $(47-\frac{1}{8}) f_H$. Accordingly, the oscillation frequency of the oscillator 10 becomes $375 f_H$. By choosing the oscillator frequency to be $375 f_H$, approximate pilot signal frequencies can be obtained by dividing the output frequency of the oscillator 10 by 1/58, 1/50, 1/40 and 1/36, respectively. The resultant frequencies are: $fp_1 = 375/58 f_H = 6.47 f_H$, $fp_2 = (375/50) f_H = 7.50 f_H$, $fp_3 = (375/40) f_H = 9.38 f_H$, and $fp_4 = (375/36) f_H = 10.42 f_H$. These frequencies have the relations: $fp_2 - fp_1 = 1.03 f_H$, $fp_4 - fp_3 = 1.04 f_H$, $fp_3 - fp_1 = 2.91 f_H$, and $fp_4 - fp_2 = 2.92 f_H$. The coincidence exists between $(fp_2 - fp_1)$ and $(fp_4 - fp_3)$, and between $(fp_3 - fp_2)$ and $(fp_4 - fp_2)$, allowing a slight error of $0.01 f_H = 156$ Hz. Accordingly, the above frequencies $fp_1 - fp_4$ meet the conditions of the pilot signal frequencies.

Moreover, the above frequency division factors of the pilot signals have a common term of $\frac{1}{2}$, and thus by supplying the output of the $\frac{1}{2}$ divider 60 in the frequency divider 9 to the pilot signal generator 68, the frequency dividers in it can have smaller division factors.

Figure 14:
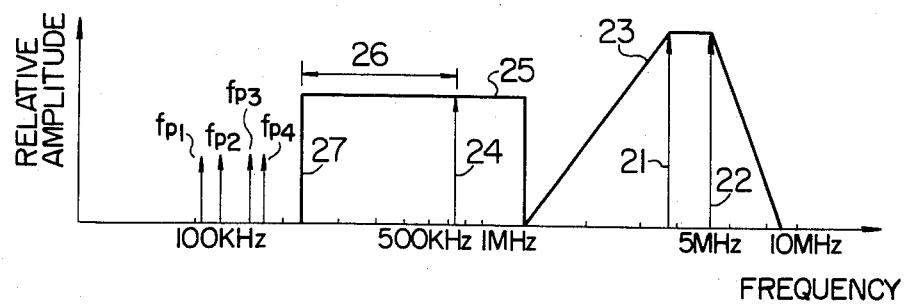
FIG. 14 is a frequency spectrum diagram for the recording signal in the inventive color video signal recording apparatus.

FIG. 14 shows the frequency distribution of the above-mentioned pilot signals, the recording chroma signal and the frequency-modulated luminance signal.

Figure 15:
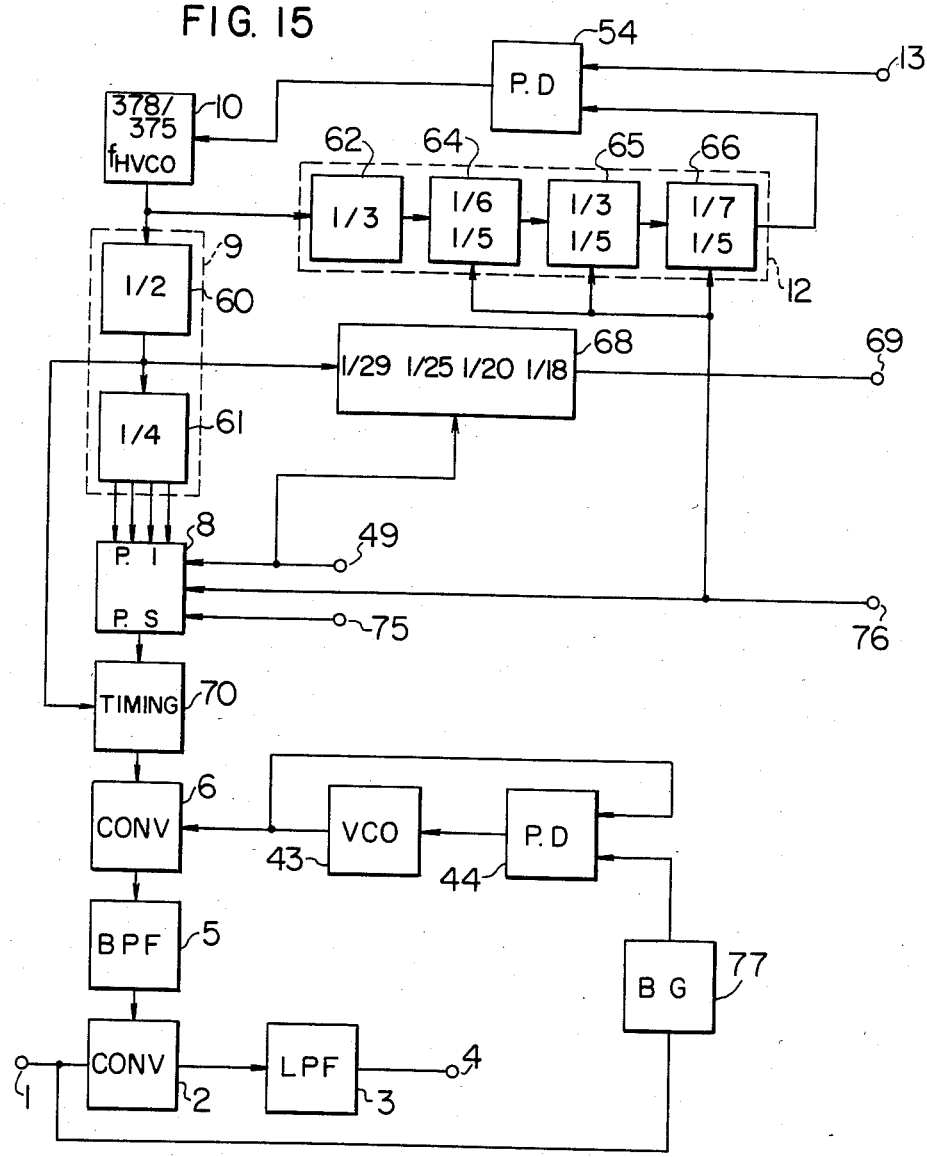
FIG. 15 is a block diagram showing another embodiment of the inventive chroma signal frequency converting circuit.
Figure 16:
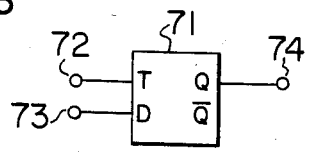
FIG. 16 is a schematic diagram exemplifying the waveform shaping circuit used in the arrangement of FIG. 15.

FIG. 15 is a block diagram showing another embodiment of the NTSC and CCIR chroma signal recording circuit. In the arrangement of FIG. 15, the oscillation frequency of the oscillator 10 is chosen to be $(47+\frac{1}{4}) \times 8 f_H = 378 f_H$ with the value of N set to 126 so as to meet the condition of $\frac{3}{8} N \cdot f_H$ for NTSC system, and $(47-\frac{1}{8}) \times 8 f_H = 375 f_H$ with the value of N set to 125 for CCIR system. Further, the frequency divider 12 is arranged to be $1/378 = \frac{1}{3} \times \frac{1}{3} \times \frac{1}{3} \times \frac{1}{2} \times 1/7$ for NTSC system, and $1/375 = \frac{1}{3} \times 1/5 \times 1/5 \times 1/5$ for CCIR system. In order to minimize the chip size and power consumption for the integrated frequency divider 12, the $\frac{1}{3}$ divider 62 is used commonly for the NTSC and CCIR signals, the frequency divider 64 is operated selectively as a 1/6 divider for the NTSC signal and as a 1/5 divider for the CCIR signal, the frequency divider 65 is switched for $\frac{1}{2}$ and 1/5, and the frequency divider 66 is switched for 1/7 and 1/5 for the NTSC and CCIR signals, respectively. The frequency divider 9 is made up of a $\frac{1}{2}$ divider 60 and a $\frac{1}{4}$ divider 61. A waveform shaper 70 is connected between the phase selection circuit 8 and the frequency converter 6. The input terminal 75 receives the switching signal for selecting 90° phase shift or 180° phase shift for the phase selection circuit 8, and the terminal 76 receives the switching signal for selecting the NTSC or CCIR mode. Reference number 77 denotes a burst gate circuit. The waveform shaper 70 serves to time the leading edge of the output signal from the phase selection circuit 8. One embodiment of the waveform shaper 70 is shown in FIG. 16, where the T terminal 72 of flip-flop 71 receives the output of the $\frac{1}{2}$ frequency divider 60, while the D terminal 73 receives the output of the phase selection circuit 8, providing a correctly timed rising signal at the output terminal 74. In this embodiment, N is set to 126 so that $(3N-2)/4$ is an integer, and the NTSC chroma signal is subjected to 180° phase shift.

Figure 17:
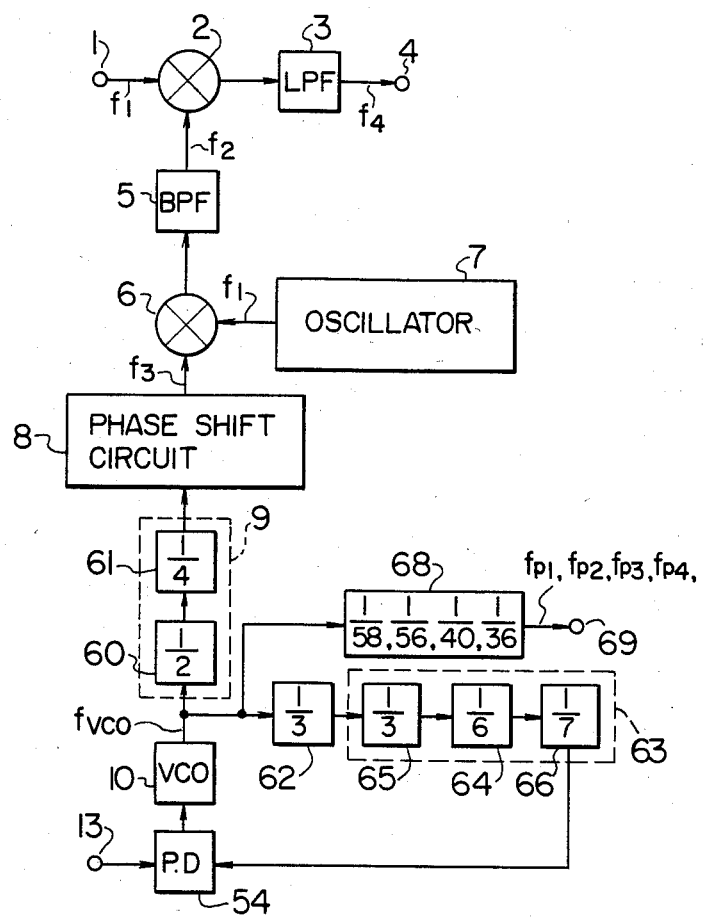
FIG. 17 is a block diagram showing still another embodiment of the inventive chroma signal frequency converting circuit.

FIG. 17 shows an embodiment of the best-mode NTSC chroma signal recording circuit combined with the CCIR chroma signal recording circuit, wherein the pilot signals are provided. The arrangement of FIG. 17 includes a frequency divider 63 constituting a phase matching circuit, made up of a $\frac{1}{3}$ frequency divider 65, a 1/6 divider 64 and a 1/7 divider 66, and it forms a 1/126 frequency divider effectively. The phase selection circuit 8 does not perform phase shifting for the first field and performs a 180° phase shift in every horizontal scanning period for the second field. On this account, the oscillator 10 provides the oscillation frequency of $f_{VCO} = 3 \times 126 f_H = 378 f_H$. Accordingly, the output frequency $f_3$ of the phase selection circuit 8 becomes $f_3 = (378/8) f_H = (47+\frac{1}{4}) f_H$ for the first field, and $f_3 = (378/8 - \frac{1}{2}) f_H = (47-\frac{1}{4}) f_H$ for the second field. Consequently, the input frequency of the second converter 2 becomes $f_2 = 3.58$ MHz $+ 47 f_H + \frac{1}{4} f_H$ and its output frequency becomes $f_4 = (47+\frac{1}{4}) f_H$ for the first field, and $f_2 = 3.58$ MHz $+ 47 f_H - \frac{1}{4} f_H$ and $f_4 = (47-\frac{1}{4}) f_H$ for the second field. Thus the necessary conditions for the recording chroma signal in NTSC system is met. In the arrangement of FIG. 17, the pilot signal generator 68 has the same frequency division factors as those of the circuit shown in FIG. 13, and the pilot signal frequencies are provided as: $fp_1 = (378/58) f_H = 6.52 f_H$, $fp_2 = (378/50) f_H = 7.56 f_H$, $fp_3 = (378/40) f_H = 9.45 f_H$, and $fp_4 = (378/36) f_H = 10.50 f_H$. These frequencies have the relation of: $fp_2 - fp_1 = 1.04 f_H$, $fp_4 - fp_3 = 1.05 f_H$, $fp_3 - fp_1 = 2.93 f_H$, and $fp_4 - fp_2 = 2.94 f_H$. Thus coincidence exists between $(fp_2 - fp_1)$ and $(fp_4 - fp_3)$ and between $(fp_3 - fp_1)$ and $(fp_4 - fp_2)$, allowing an error of $0.01 f_H \approx 157$ Hz.

Figure 18:
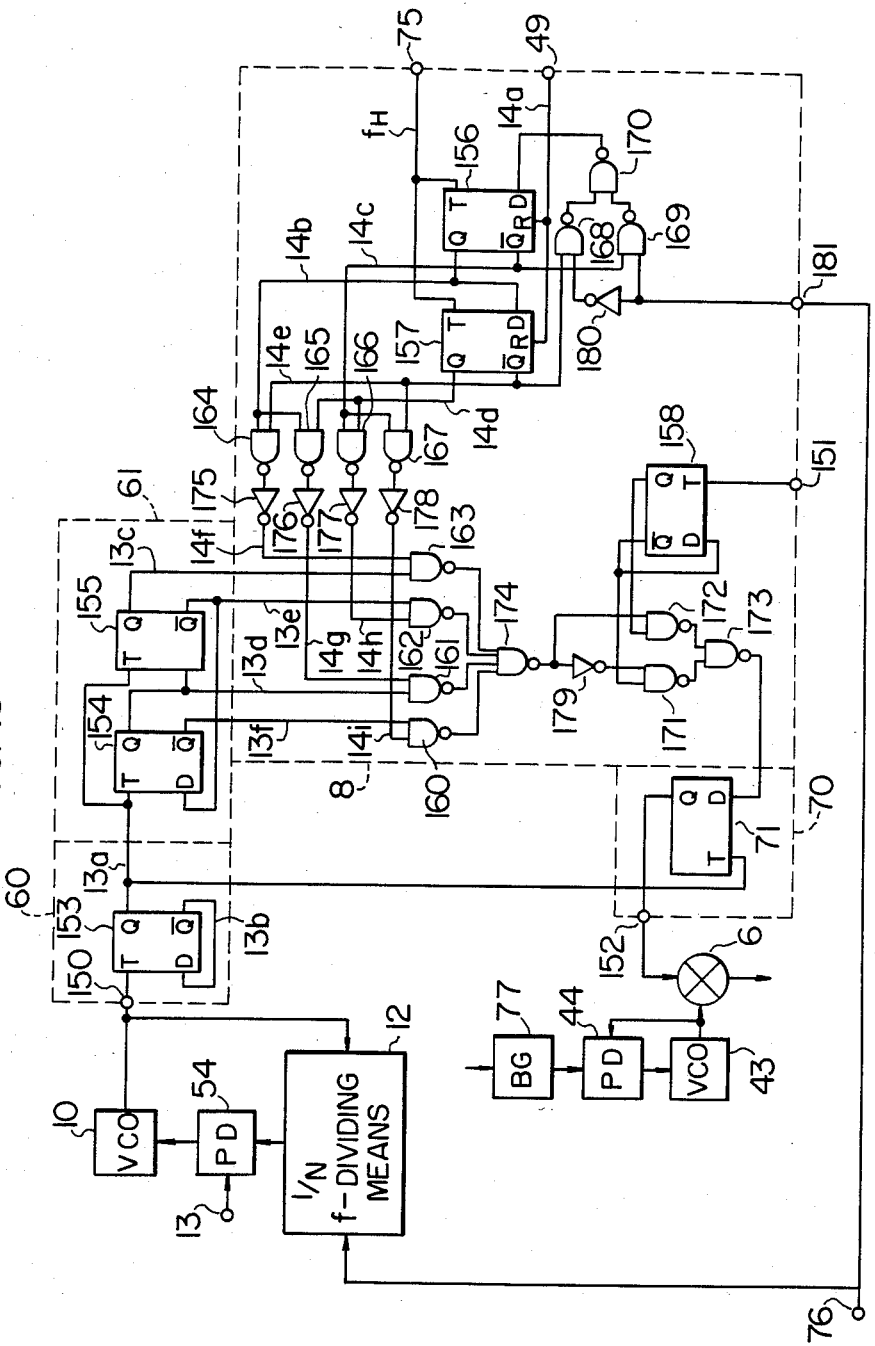
FIG. 18 is a schematic diagram exemplifying the phase selecting circuit.
Figure 19:
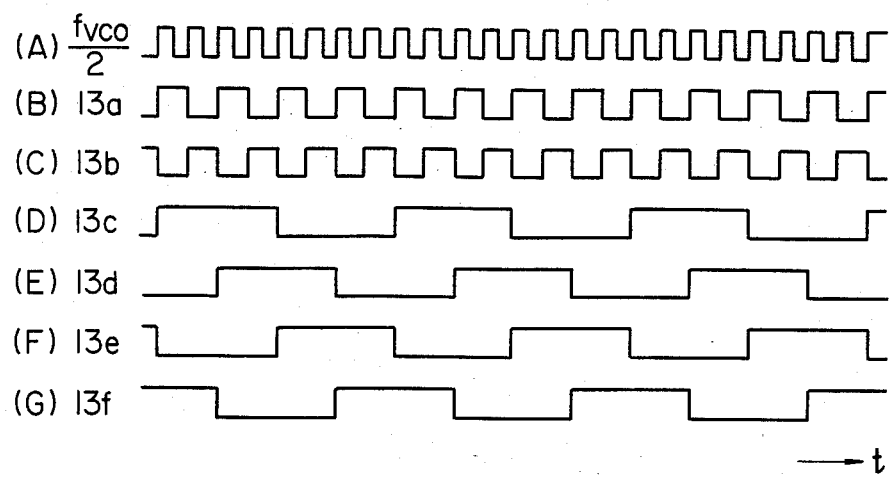
FIGS. 19, 20 and 21 are sets of waveform charts showing the operation of the circuit arrangement shown in FIG. 18.
Figure 20:
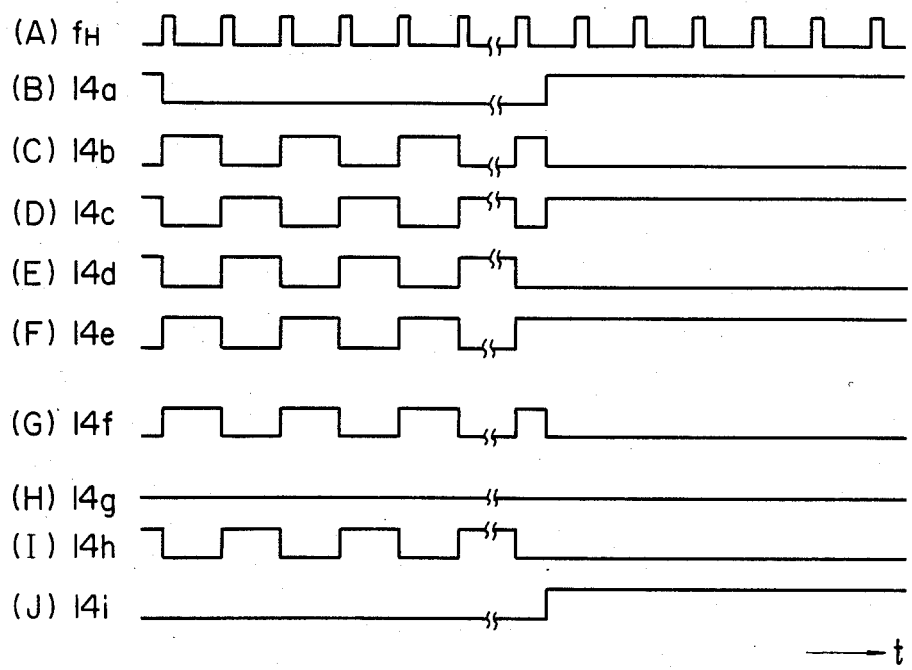
Figure 21:
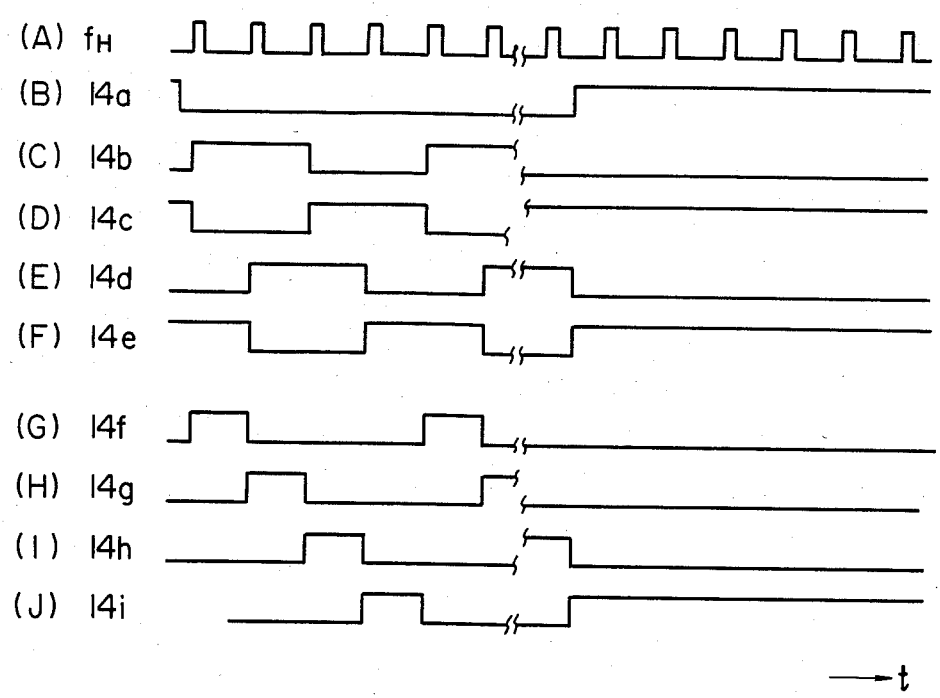

FIG. 18 shows an embodiment of the phase selection circuit 8. FIGS. 19, 20 and 21 are timing charts for the arrangement of FIG. 18.

The operation in the NTSC mode will first be described. In the NTSC mode, the control signal input terminal 76 receives a high level signal so as to select the frequency division factor for the frequency divider 12 of $1/378 = \frac{1}{3} \times \frac{1}{3} \times \frac{1}{3} \times \frac{1}{2} \times 1/7$, and at the same time operates on NAND gates 168, 169 and 170 through the terminal 181 so as to conduct the Q output of flip-flop 156 to the D input. Signal 14a at the terminal 49 indicating the track resets the flip-flops 156 and 157 during a high period. Then the flip-flops 156 and 157 provide the output signals as shown by the waveforms 14c, 14d, 14e and 14f in FIG. 20. The NAND gate 164 takes logical product in cooperation with inverter 125 between the signals 14b and 14e, the NAND gate 165 and inverter 176 take logical product between the signals 14b and 14d, the NAND gate 166 and inverter 177 take logical product between the signals 14c and 14d, and the NAND gate 167 and inverter 178 take logical product between the signals 14c and 14d, so as to provide respective output signals 14f, 14g, 14h and 14i.

The VCO 10 provides the oscillation frequency of $378 f_H$ in cooperation with the frequency divider 12 and the phase comparator 54. The output of the VCO 10 is conducted through the terminal 150 to terminal T of flip-flop 153 constituting a $\frac{1}{2}$ frequency divider 60. The Q output of the flip-flop 153 is conducted to terminal T of flip-flop 154 constituting a $\frac{1}{4}$ frequency divider 61. The same effect will result in this case when the Q output 13b of the flip-flop 153 is conducted to the T terminal of the flip-flops 154 and 155. Terminals Q and $\bar{Q}$ of the flip-flops 154 and 155 provide signals 13c, 13d, 13e and 13f having a frequency of $378/8 f_H = (47+\frac{1}{4}) f_H$ with phase departing from each other by 90° as shown in FIG. 19. These signals are taken logical product with the above-mentioned signals 14f, 14g, 14h and 14i by the NAND gates 160, 161, 162 and 163, respectively, and signals 13c and 13e with a phase difference of 180° are obtained alternately in every horizontal period at the output of the NAND gate 174 during a period when signal 14a indicating the track is low. When the signal 14a is high, the NAND gates 163, 162 and 161 are disabled, allowing the NAND gate 174 to provide normally at its output the signal 13f.

The NAND gates 171, 172 and 173 serve as switches controlled by the Q and $\bar{Q}$ outputs of the flip-flop 158, and the output signals at the Q and $\bar{Q}$ terminals of the NAND gate 174 are phase-reversed each time a pulse signal is applied to the terminal 151. The signal supplied to the terminal 151 is, for example, a signal representing the discontinuity of the reproduced chroma signal which occurs when the heads are switched. The phase of the output of the flip-flop 153 is regulated by the flip-flop 71 constituting a waveform shaper 70, then conducted through the terminal 152 to the frequency converter 6.

Next, the operation in the CCIR mode will be described. This operation differs from that of the NTSC mode in that the frequency divider 12 is controlled by a low level signal at the control signal input terminal so as to select the frequency division factor of $1/375 = 1/3 \times 1/5 \times 1/5 \times 1/5$, and the NAND gates 168, 169 and 170 are operated through the terminal 181 so as to conduct the Q output of the flip flop 157 to the D input of the flip-flop 156. In this case, the outputs of the flip-flops 156 and 157 have the waveforms as shown by 14b, 14c, 14d and 14e in FIG. 15. Accordingly, the inverters 175, 176, 177 and 178 provide signals as shown by 14f, 14g, 14h and 14i in FIG. 21. The Q and $\bar{Q}$ terminals of the flip-flops 154 and 155 provide signals 13c, 13d, 13e and 13f having a frequency of $375/8f_H = (44 - 1/8)f_H$ with phase departing by 90° from each other. These signals are taken logical product with the above-mentioned signals 14f, 14g, 14h and 14i, and the NAND gate 174 provides at its output terminal 13c, 13d, 13e and 13f in each horizontal period during the period when the signal 14a indicating the track is low, and provides signal 13f normally during the period when the signal 14a is high. The arrangement can readily be modified so that when the track indicating signal 14a is low, signals 13f, 13e, 13d and 13c are obtained in each horizontal period, and signal 13f is obtained normally when the signal 14a is high. Thus the phase shift of both +90° and −90° can readily be realized.

As described above, when designing a magnetic recording and reproducing apparatus for recording color television signals of the CCIR system, the recording chroma signal frequency is chosen to be $\frac{3}{8}N \cdot f_H$ (where $f_H$ is an odd number), whereby a large part of the lower carrier generator can be used for recording the chroma signal of the NTSC system, and the chroma signals in the NTSC and CCIR color television signals can be processed by the common circuit. Similarly, in designing a magnetic recording and reproducing apparatus for recording color television signals in the NTSC system, the recording chroma signal frequency is chosen to be $\frac{3}{8}N \cdot f_H$ (where N is an integer), whereby color television signals in the CCIR system can also be recorded by a slight modification of the circuit. It will be appreciated from the foregoing descriptions that the value of N is chosen so that N/4 is an integer in case of 90° phase shift or N is chosen so that (3N−2)/4 is an integer in case of 180° phase shift for recording the NTSC signals. There are many values for N to take which meet the above conditions, and some examples are listed in Table 1. In Table 1, multiples of the horizontal frequency are given as 3N, which is multiplied by $f_H$ to provide the oscillation frequency of the VCO.

Table 1 lists some preferable combinations of the color subcarrier frequencies for NTSC and CCIR systems. When selection is made giving precedence to the NTSC system, mode C, D, I, J, M, N, O, and P are preferable since they are achieved by using frequency dividers each having a division factor of less than 10. When selection is made giving precedence to the CCIR system, mode M is preferable by the same reason. Accordingly, the best mode is M when merely considering the easiness of designing the chroma circuit.

Table 2 lists some examples of the relationship between the color subcarrier frequency and the pilot signal frequencies which can be generated by the chroma circuit. In order to provide an enhanced servo characteristics by the pilot signals, the value of $|(f_2 - f_1) - (f_4 - f_3)|$ should be made as near zero as possible, and it should be 200 Hz (0.013 $f_H$) as the worst case.

Suitable modes for generating the pilot signals are modes 6, 11, 13, 16, and 20 for the NTSC system, and modes 7, 10, 12, 15, 17, and 19 for the CCIR system. The preferable combinations for the NTSC and CCIR systems from the view point of generating the pilot signals are combinations of 6 and 7; 10 and 11; 12 and 13; 15 and 16; 16 and 17; and 19 and 20. All these combinations are further advantageous, providing a common division factor in producing the pilot signals for the NTSC and CCIR systems. Particularly, combinations 15 and 16, and 16 and 17 provide even frequency division factors for producing the pilot signals, allowing easy suppression against the generation of harmonic distortions in the pilot signals and also a simple arrangement of frequency dividers.

In Table 1, the preferable modes in consideration of both the easiness of designing the chroma circuit and the easiness of producing the pilot signals are modes I, M and N when giving precedence to the NTSC system, or mode M when giving precedence to the CCIR system.

TABLE 1

| Mode | 3N NTSC | 3N CCIR | Color subcarrier frequency NTSC | Color subcarrier frequency CCIR | Phase shift NTSC | Phase shift CCIR | Frequency division factor NTSC | Frequency division factor CCIR |
|------|------|------|------|------|------|------|------|------|
| A | 330 | 327 | $(41 + \frac{1}{4})f_h$ | $(41 - \frac{1}{4})f_h$ | 180° | 90° | $2 \times 3 \times 5 \times 11$ | $3 \times 109$ |
| B | 330 | 333 | $(41 + \frac{1}{4})f_h$ | $(42 - \frac{3}{4})f_h$ | 180° | 90° | $2 \times 3 \times 5 \times 11$ | $3 \times 111$ |
| C | 336 | 333 | $42f_h$ | $(42 - \frac{3}{4})f_h$ | 90° | 90° | $2^4 \times 3 \times 7$ | $3 \times 111$ |
| D | 336 | 339 | $42f_h$ | $(42 + \frac{3}{4})f_h$ | 90° | 90° | $2^4 \times 3 \times 7$ | $3 \times 113$ |
| E | 342 | 339 | $(43 - \frac{1}{4})f_h$ | $(42 + \frac{3}{4})f_h$ | 180° | 90° | $2 \times 3 \times 3 \times 19$ | $3 \times 113$ |
| F | 342 | 345 | $(43 - \frac{1}{4})f_h$ | $(43 + \frac{1}{4})f_h$ | 180° | 90° | $2 \times 3 \times 3 \times 19$ | $3 \times 5 \times 23$ |
| G | 354 | 351 | $(44 + \frac{1}{4})f_h$ | $(44 - \frac{1}{4})f_h$ | 180° | 90° | $2 \times 3 \times 59$ | $3 \times 3 \times 3 \times 13$ |
| H | 354 | 357 | $(44 + \frac{1}{4})f_h$ | $(45 - \frac{3}{4})f_h$ | 180° | 90° | $2 \times 3 \times 59$ | $3 \times 7 \times 17$ |
| I | 360 | 357 | $45f_h$ | $(45 - \frac{3}{4})f_h$ | 90° | 90° | $2^3 \times 3^2 \times 5$ | $3 \times 119$ |
| J | 360 | 363 | $45f_h$ | $(45 + \frac{3}{4})f_h$ | 90° | 90° | $2^3 \times 3^2 \times 5$ | $3 \times 11 \times 11$ |

TABLE 1-continued

| | 3N | | Color subcarrier frequency | | Phase shift | | Frequency division factor | |
|---|---|---|---|---|---|---|---|---|
| Mode | NTSC | CCIR | NTSC | CCIR | NTSC | CCIR | NTSC | CCIR |
| K | 366 | 363 | $(46 - \frac{1}{4})f_h$ | $(45 + \frac{3}{8})f_h$ | 180° | 90° | $2 \times 3 \times 61$ | $3 \times 11 \times 11$ |
| L | 366 | 369 | $(46 - \frac{1}{4})f_h$ | $(46 + \frac{1}{8})f_h$ | 180° | 90° | $2 \times 3 \times 61$ | $3 \times 3 \times 41$ |
| M | 378 | 375 | $(47 + \frac{1}{4})f_h$ | $(47 - \frac{1}{8})f_h$ | 180° | 90° | $2 \times 3 \times 3 \times 3 \times 7$ | $3 \times 5 \times 5 \times 5$ |
| N | 378 | 381 | $(47 + \frac{1}{4})f_h$ | $(48 - \frac{3}{8})f_h$ | 180° | 90° | $2 \times 3 \times 3 \times 3 \times 7$ | $3 \times 127$ |
| O | 384 | 381 | $48f_h$ | $(48 - \frac{3}{8})f_h$ | 90° | 90° | $2^7 \times 3$ | $3 \times 127$ |
| P | 384 | 387 | $48f_h$ | $(48 + \frac{3}{8})f_h$ | 90° | 90° | $2^7 \times 3$ | $3 \times 3 \times 43$ |
| Q | 390 | 387 | $(49 - \frac{1}{4})f_h$ | $(48 + \frac{3}{8})f_h$ | 180° | 90° | $2 \times 3 \times 5 \times 13$ | $3 \times 3 \times 43$ |
| R | 390 | 393 | $(49 - \frac{1}{4})f_h$ | $(49 + \frac{1}{8})f_h$ | 180° | 90° | $2 \times 3 \times 5 \times 13$ | $3 \times 131$ |

TABLE 2

| Mode | $3N_1$ | $\frac{3}{8}N_1 f_h$ | Frequency division factors for pilot signals | | | | Pilot signal frequencies | | | | $\|(f_2 - f_1) - (f_4 - f_3)\|$ |
|---|---|---|---|---|---|---|---|---|---|---|---|
| | | | $N_2$ | $N_3$ | $N_4$ | $N_5$ | $f_1 = \frac{3N_1}{N_2} f_h$ | $f_2 = \frac{3N_1}{N_3} f_h$ | $f_3 = \frac{3N_1}{N_4} f_h$ | $f_4 = \frac{3N_1}{N_5} f_h$ | |
| 1 | 327 | $(41 - \frac{1}{8})f_h$ | 51 | 43 | 35 | 31 | $6.412 f_h$ | $7.605 f_h$ | $9.343 f_h$ | $10.548 f_h$ | $0.012 f_h$ |
| 2 | 330 | $(41 + \frac{1}{4})f_h$ | 52 | 44 | 35 | 31 | $6.346 f_h$ | $7.500 f_h$ | $9.429 f_h$ | $10.645 f_h$ | $0.062 f_h$ |
| 3 | 333 | $(42 - \frac{3}{8})f_h$ | 50 | 44 | 35 | 32 | $6660 f_h$ | $7.568 f_h$ | $9.514 f_h$ | $10.406 f_h$ | $0.016 f_h$ |
| 4 | 336 | $42 f_h$ | 51 | 45 | 35 | 32 | $6.588 f_h$ | $7.467 f_h$ | $9.600 f_h$ | $10.500 f_h$ | $0.021 f_h$ |
| 5 | 339 | $(42 + \frac{3}{8})f_h$ | 53 | 45 | 36 | 32 | $6.396 f_h$ | $7.533 f_h$ | $9.417 f_h$ | $10.594 f_h$ | $0.040 f_h$ |
| 6 | 342 | $(43 - \frac{1}{4})f_h$ | 52 | 46 | 36 | 33 | $6.577 f_h$ | $7.435 f_h$ | $9.500 f_h$ | $10.364 f_h$ | $0.006 f_h$ |
| 7 | 345 | $(43 + \frac{1}{8})f_h$ | 52 | 46 | 36 | 33 | $6.635 f_h$ | $7.500 f_h$ | $9.583 f_h$ | $10.455 f_h$ | $0.007 f_h$ |
| 8 | 351 | $(44 - \frac{1}{8})f_h$ | 54 | 46 | 37 | 33 | $6.500 f_h$ | $7.630 f_h$ | $9.486 f_h$ | $10.636 f_h$ | $0.020 f_h$ |
| 9 | 354 | $(44 + \frac{1}{4})f_h$ | 54 | 48 | 37 | 34 | $6.556 f_h$ | $7.375 f_h$ | $9.568 f_h$ | $10.412 f_h$ | $0.025 f_h$ |
| 10 | 357 | $(45 - \frac{3}{8})f_h$ | 55 | 47 | 38 | 34 | $6.491 f_h$ | $7.596 f_h$ | $9.395 f_h$ | $10.500 f_h$ | $0.000 f_h$ |
| 11 | 360 | $45 f_h$ | 55 | 47 | 38 | 34 | $6.545 f_h$ | $7.660 f_h$ | $9.474 f_h$ | $10.588 f_h$ | $0.001 f_h$ |
| 12 | 363 | $(45 + \frac{3}{8})f_h$ | 55 | 49 | 38 | 35 | $6.600 f_h$ | $7.408 f_h$ | $9.553 f_h$ | $10.371 f_h$ | $0.010 f_h$ |
| 13 | 366 | $(46 - \frac{1}{4})f_h$ | 55 | 49 | 38 | 35 | $6.655 f_h$ | $7.469 f_h$ | $9.632 f_h$ | $10.457 f_h$ | $0.011 f_h$ |
| 14 | 369 | $(46 + \frac{1}{8})f_h$ | 57 | 49 | 39 | 35 | $6.474 f_h$ | $7.531 f_h$ | $9.462 f_h$ | $10.543 f_h$ | $0.024 f_h$ |
| 15 | 375 | $(47 - \frac{1}{8})f_h$ | 58 | 50 | 40 | 36 | $6.466 f_h$ | $7.500 f_h$ | $9.375 f_h$ | $10.417 f_h$ | $0.008 f_h$ |
| 16 | 378 | $(47 + \frac{1}{4})f_h$ | 58 | 50 | 40 | 36 | $6.517 f_h$ | $7.560 f_h$ | $9.450 f_h$ | $10.500 f_h$ | $0.007 f_h$ |
| 17 | 381 | $(48 - \frac{3}{8})f_h$ | 58 | 50 | 40 | 36 | $6.569 f_h$ | $7.620 f_h$ | $9.525 f_h$ | $10.583 f_h$ | $0.007 f_h$ |
| 18 | 384 | $48 f_h$ | 60 | 52 | 41 | 37 | $6.400 f_h$ | $7.385 f_h$ | $9.366 f_h$ | $10.378 f_h$ | $0.027 f_h$ |
| 19 | 387 | $(48 + \frac{3}{8})f_h$ | 59 | 51 | 41 | 37 | $6.559 f_h$ | $7.588 f_h$ | $9.439 f_h$ | $10.459 f_h$ | $0.009 f_h$ |
| 20 | 390 | $(49 - \frac{1}{4})f_h$ | 59 | 51 | 41 | 37 | $6.610 f_h$ | $7.647 f_h$ | $9.512 f_h$ | $10.541 f_h$ | $0.008 f_h$ |
| 21 | 393 | $(49 + \frac{1}{8})f_h$ | 61 | 53 | 42 | 38 | $6.443 f_h$ | $7.415 f_h$ | $9.357 f_h$ | $10.342 f_h$ | $0.013 f_h$ |

What is claimed is:

1. A color video signal recording apparatus wherein a luminance signal and a chrominance signal are separated from a color video signal, said luminance signal is transformed into a frequency modulation signal, said chrominance signal is converted to have a lower frequency, and said frequency-modulated luminance signal and said frequency-converted chrominance signal are recorded on a frequency multiplex basis on a recording medium, comprising:

a frequency converter which receives said chrominance signal separated from said color video signal;

a reference oscillator for generating a reference signal;

a phase selection circuit which receives the output of said reference oscillator and shifts the phase of the output of said reference oscillator by 90° or 180° in every horizontal period;

means for supplying the output of said phase selection circuit to said frequency converter, said frequency converter being operable to mix said chrominance signal with the output of said phase selection circuit so as to convert the frequency of said chrominance signal into said lower frequency;

a control means connected to said reference oscillator and adapted to control the oscillation frequency of said reference oscillator such that the frequency of said frequency-converted chrominance signal is $\frac{3}{8}N \cdot f_H$ (where N is an integer and $f_H$ is a horizontal scanning frequency) and at the same time N/4 is an integer in case said phase selection circuit shifts the phase of the output of said reference oscillator by 90° in every horizontal period or (2N−2)/4 is an integer in case said phase selection circuit shifts the phase of the output of said reference oscillator by 180° in every horizontal period; and means connected to the output of said frequency converter and adapted to extract said frequency-converted chrominance signal which is converted into the lower frequency.

2. A color video signal recording apparatus wherein a luminance signal and a chrominance signal are separated from a color video signal of NTSC system, said luminance signal is transformed into a frequency modulation signal, said chrominance signal is converted to have a lower frequency, and said frequency-modulated luminance signal and said frequency-converted chrominance signal are recorded on a frequency multiplex basis on a recording medium, comprising:

a frequency converter which receives said chrominance signal separated from said color video signal;

a voltage controlled oscillator for generating a reference signal;

a first frequency divider which receives the output of said voltage controlled oscillator and divides the frequency of the output of said voltage controlled oscillator;

a phase selection circuit which receives the output of said first frequency dividing means and shifts the phase of the output of said frequency dividing means by 90° or 180° in every horizontal scanning period;

means for supplying the output of said phase selection circuit to said frequency converter, said frequency converter being operable to mix said chrominance signal with the output of said phase selection circuit so as to convert the frequency of said chrominance signal into said lower frequency;

a second frequency dividing means connected to said voltage controlled oscillator and adapted to control the oscillation frequency of said voltage controlled oscillator such that the frequency of said frequency-converted chrominance signal is $\frac{3}{8}N \cdot f_H$ (where N is an integer and $f_H$ is a horizontal scanning frequency) and at the same time N/4 is an integer in case said phase selection circuit shifts the phase of the output of said reference oscillator by 90° in every horizontal period or $(3N-2)/4$ is an integer in case said phase selection circuit shifts the phase of the output of said reference oscillator by 180° in every horizontal period; and means connected to the output of said frequency converter and adapted to extract said frequency-converted chrominance signal.

3. A color video signal recording apparatus according to claim 2, wherein said first frequency divider comprises a 1-to-8 frequency divider, and said second frequency dividing means is provided with at least one 1-to-3 frequency divider.

4. A color video signal recording apparatus wherein a luminance signal and a chrominance signal are separated from a color video signal, said luminance signal is transformed into a frequency modulation signal, a subcarrier frequency of said chrominance signal is converted to have a lower frequency, and said frequency modulated luminance signal and said frequency-converted chrominance signal are recorded on a frequency multiplex basis on a recording medium, comprising:

a frequency converter which receives said chrominance signal separated from said color video signal;

a voltage controlled oscillatory for oscillating a reference signal;

a closed loop circuit for said voltage controlled oscillator comprising: frequency dividers which receive the reference signal of said voltage controlled oscillator and divide the frequency of said reference signal and a phase comparator for comparing the phases of an output signal of said frequency divider and a signal related to a horizontal synchronizing signal included in said color video signal and for supplying an error signal to said voltage controlled oscillator as a control signal, said closed loop comprising $\frac{1}{8}$ frequency divider and 1/N frequency divider in which said frequency dividers are cascade connected;

$\frac{1}{8}$ frequency divider for dividing the frequency of said reference signal generated in said voltage controlled oscillator by $\frac{1}{8}$;

a phase shift circuit which receives an output signal of said $\frac{1}{8}$ frequency divider and shifts the phase of the output of said $\frac{1}{8}$ frequency divider by 180° in every horizontal period in either one of a first field period and a second field period forming one frame picture of said color video signal when said color video signal is a signal of NTSC system, and shift the phase of the output of said $\frac{1}{8}$ frequency divider by 90° in every horizontal period in either one of said first field period and said second field period when said color video signal is a signal of CCIR system;

means for supplying the output signal of said phase shift circuit to said frequency converter; and means connected to the output of said frequency converter and adapted to extract said chrominance signal the subcarrier frequency of which is converted into the lower frequency, said color video signal and the output signal of said phase shift circuit being mixed by said frequency converter to convert the subcarrier frequency of said color video signal to the lower frequency, and in said 1/N frequency divider the value of N being chosen so that $(3N-2)/4$ is an integer when said color video signal of NTSC system and the value of N being chosen odd number when said color video signal is a signal of CCIR system.

5. A color video signal recording apparatus wherein a luminance signal and a chrominance signal are separated from a color video signal, said luminance signal is transformed into a frequency modulation signal, a subcarrier frequency of said chrominance signal is converted to have a lower frequency, and said frequency-modulated luminance signal, said frequency-converted chrominance signal and plurality of pilot signals are recorded on a frequency multiplex basis on a recording medium, comprising:

a frequency converter which receives said chrominance signal separated from said color video signal;

a reference oscillator for generating a reference signal;

a phase selection circuit which receives the output of said reference oscillator and shifts the phase of the output of said reference oscillator by 90° or 180° in every horizontal period;

means for supplying the output of said phase selection circuit to said frequency converter, said frequency converter being operable to mix said chrominance signal with the output of said phase selection circuit so as to convert the frequency of said chrominance signal into said lower frequency;

a control means connected to said reference oscillator and adapted to control the oscillation frequency of said reference oscillator such that the frequency of said frequency-converted chrominance signal is $(3 \cdot N \cdot f_H)/8$ (where N is an integer and $f_H$ is a horizontal scanning frequency) and at the same time 1/N is an integer in case said phase selection circuit selects the 90° phase shift or $(3N-2)/4$ is an integer in case said phase selection circuit selects the 180° phase shift;

a first frequency divider which receives the reference signal of said reference oscillator and divides the frequency of the reference signal by 1/58 to obtain a first pilot signal;

a second frequency divider for dividing the frequency of the reference signal by 1/50 to obtain a second pilot signal;

a third frequency divider for dividing the frequency of the reference signal by 1/40 to obtain a third pilot signal;

a fourth frequency divider for dividing the frequency of the reference signal by 1/36 to obtain a fourth pilot signal;

means connected to the output of said frequency converter and adapted to extract said frequency-converted chrominance signal which is converted into the lower frequency; and means connected to each output of said first, second, third and fourth frequency dividers and adapted to extract said first, second, third and fourth pilot signals.

* * * * *